United States Patent
Dutta

(10) Patent No.: US 11,431,616 B2
(45) Date of Patent: Aug. 30, 2022

(54) LOOP DETECTION IN MULTIPROTOCOL LABEL SWITCHING

(71) Applicant: Nokia Solutions and Networks Oy, Espoo (FI)

(72) Inventor: Pranjal Kumar Dutta, Sunnyvale, CA (US)

(73) Assignee: Nokia Solutions and Networks Oy, Espoo (FI)

( * ) Notice: Subject to any disclaimer, the term of this patent is extended or adjusted under 35 U.S.C. 154(b) by 173 days.

(21) Appl. No.: 16/793,932

(22) Filed: Feb. 18, 2020

(65) Prior Publication Data

US 2021/0258242 A1 Aug. 19, 2021

(51) Int. Cl.
*H04L 45/18* (2022.01)
*H04L 45/50* (2022.01)
*H04L 45/64* (2022.01)

(52) U.S. Cl.
CPC .............. *H04L 45/18* (2013.01); *H04L 45/50* (2013.01); *H04L 45/64* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,342,877 B1* | 3/2008 | Ervin | ...................... | H04L 12/42 370/217 |
| 9,467,478 B1* | 10/2016 | Khan | ...................... | H04L 45/00 |
| 9,692,687 B2 | 6/2017 | Lucent | | |
| 9,838,299 B2* | 12/2017 | Alvarez | ................. | H04L 45/123 |
| 9,929,946 B2* | 3/2018 | Filsfils | .................... | H04L 45/02 |
| 10,165,093 B2* | 12/2018 | Filsfils | .................... | H04L 45/50 |
| 2011/0202761 A1* | 8/2011 | Sarela | ..................... | H04L 45/48 713/163 |
| 2016/0142293 A1* | 5/2016 | Hu | ........................ | H04L 45/745 370/392 |
| 2017/0126522 A1* | 5/2017 | McCann | ................. | H04L 67/28 |
| 2020/0120020 A1* | 4/2020 | Dutta | ..................... | H04L 12/66 |
| 2020/0228446 A1* | 7/2020 | Geng | ..................... | H04L 45/50 |
| 2021/0099382 A1* | 4/2021 | Liu | ..................... | H04L 61/6086 |

FOREIGN PATENT DOCUMENTS

EP 2661028 11/2013

OTHER PUBLICATIONS

Extended European Search Report for Application No. 21157798.6-1215, dated Jul. 20, 2021, 9 pages.
Andersson, L., "LDP Specification," Network Working Group, Request for Comments 3036, Jan. 31, 2001, 133 pages.

(Continued)

*Primary Examiner* — Xavier S Wong
(74) *Attorney, Agent, or Firm* — Tong, Rea, Bentley & Kim, LLC

(57) ABSTRACT

A router is configured for deployment in a network. The router includes a memory configured to store a first identifier that uniquely identifies the router in the network. The router also includes a processor configured to push the first identifier onto a first labeled data packet prior to transmission of the first labeled data packet. In response to detecting the first identifier in a second labeled data packet received from the network, the processor is configured to drop the second labeled data packet.

22 Claims, 27 Drawing Sheets

(56) References Cited

OTHER PUBLICATIONS

Andersson, L., "LDP Specification", Network Working Group, Request for Comments: 5036, Oct. 2007, 135 pages.
Atlas, A., "Basic Specification for IP Fast Reroute: Loop-Free Alternates", Network Working Group, Request for Comments: 5286, Sep. 2008, 31 pages.
Awduche, D., "RSVP-TE: Extension to RSVP for LSP Tunnels", Network Working Group, Request for Comments: 3209, Dec. 2001, 61 pages.
Bashandy, A., "Segment Routing with MPLS Data Plane", Network Working Group, Internet Draft, May 1, 2019, 38 pages.
Filsfils, C., "Segment Routing Architecture", Internet Engineering Task Force (IETF), Request for Comments: 8402, Jul. 2018, 32 pages.
Filsfils, C., "Segment Routing Policy Architecture", SPRING Working Group, Internet-Draft, May 21, 2018, 34 pages.
Katz, D., "Bidirectional Forwarding Detection (BFD)", Internet Engineering Task Force (IETF), Request for Comments: 5880, Jun. 2010, 49 pages.
Kompella, K., "Detecting Multi-Protocol Label Switched (MPLS) Data Plane Failures", Network Working Group, Request for Comments: 4379, Feb. 2006, 50 pages.
Kompella, K., "The Use of Entropy Labels in MPLS Forwarding", Internet Engineering Task Force (IETF), Request for Comments: 6790, Nov. 2012, 25 pages.
Kwok, P., "Mac Flush Look Detection in VPLS", Network Working Group, Internet-Draft, Mar. 31, 2013, 14 pages.
Rekhter, Y., "Carrying Label Information in BGP-4", Network Working Group, Request for Comments: 3107, May 2001, 8 pages.
Rosen, E., "BGP/MPLS IP Virtual Private Networks (VPNs)", Network Working Group, Request for Comments: 4364, Feb. 2006, 47 pages.
Rosen, E., "MPLS Label Stack Encoding", Network Working Group, Request for Comments: 3032, Jan. 2001, 23 pages.
Shand, M., "A Framework for Loop-Free Convergence", Internet Engineering Task Force (IETF), Request for Comments: 5715, Jan. 2010, 22 pages.
Shand, M., "Framework for Loop-Free Convergence Using the Ordered Forwarding Information Base (oFIB) Approach", Internet Engineering Task Force (IETF), Request for Comments: 6976, Jul. 2013, 28 pages.
Vasseur, J.-P., "Definition of a Record Route Object (RRO) Node-Id Sub-Object", Network Working Group, Request for Comments: 4561, Jun. 2006, 10 pages.

* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|               RRLS-I              | Exp |S|       TTL         |
+-+-+-+-+-+-+-+-+-+-+-+-+-+-+-+-+-+-+-+-+-+-+-+-+-+-+-+-+-+-+-+-+
| Type|    Num Labels(N)            | Exp |S|       TTL         |
+-+-+-+-+-+-+-+-+-+-+-+-+-+-+-+-+-+-+-+-+-+-+-+-+-+-+-+-+-+-+-+-+
|                                                               |
+                                                               +
//              Router Label Stack   (Variable)                //
//                                                             //
|                                                               |
+-+-+-+-+-+-+-+-+-+-+-+-+-+-+-+-+-+-+-+-+-+-+-+-+-+-+-+-+-+-+-+-+
```

FIG. 13

```
+-+-+-+-+-+-+-+-+-+-+-+-+-+-+-+-+-+-+-+-+-+-+-+-+-+-+-+-+-+-+-+-+
| Type|    Num Labels(N)            | Exp |S|       TTL         |
+-+-+-+-+-+-+-+-+-+-+-+-+-+-+-+-+-+-+-+-+-+-+-+-+-+-+-+-+-+-+-+-+
```

0                   1                   2                   3
    0 1 2 3 4 5 6 7 8 9 0 1 2 3 4 5 6 7 8 9 0 1 2 3 4 5 6 7 8 9 0 1
   +-+-+-+-+-+-+-+-+-+-+-+-+-+-+-+-+-+-+-+-+-+-+-+-+-+-+-+-+-+-+-+-+
   |             Router Label 1            | Exp |S|      TTL      |
   +-+-+-+-+-+-+-+-+-+-+-+-+-+-+-+-+-+-+-+-+-+-+-+-+-+-+-+-+-+-+-+-+
   |             Router Label 2            | Exp |S|      TTL      |
   +-+-+-+-+-+-+-+-+-+-+-+-+-+-+-+-+-+-+-+-+-+-+-+-+-+-+-+-+-+-+-+-+
   |             Router Label 3            | Exp |S|      TTL      |
   +-+-+-+-+-+-+-+-+-+-+-+-+-+-+-+-+-+-+-+-+-+-+-+-+-+-+-+-+-+-+-+-+
   //                                                             //
   //                                                             //
   +-+-+-+-+-+-+-+-+-+-+-+-+-+-+-+-+-+-+-+-+-+-+-+-+-+-+-+-+-+-+-+-+
   |             Router Label N            | Exp |S|      TTL      |
   +-+-+-+-+-+-+-+-+-+-+-+-+-+-+-+-+-+-+-+-+-+-+-+-+-+-+-+-+-+-+-+-+
```

0                   1                   2                   3
    0 1 2 3 4 5 6 7 8 9 0 1 2 3 4 5 6 7 8 9 0 1 2 3 4 5 6 7 8 9 0 1
   +-+-+-+-+-+-+-+-+-+-+-+-+-+-+-+-+-+-+-+-+-+-+-+-+-+-+-+-+-+-+-+-+
   |                        Router Label 1                         |
   +-+-+-+-+-+-+-+-+-+-+-+-+-+-+-+-+-+-+-+-+-+-+-+-+-+-+-+-+-+-+-+-+
   |                        Router Label 2                         |
   +-+-+-+-+-+-+-+-+-+-+-+-+-+-+-+-+-+-+-+-+-+-+-+-+-+-+-+-+-+-+-+-+
   //                                                             //
   //                                                             //
   +-+-+-+-+-+-+-+-+-+-+-+-+-+-+-+-+-+-+-+-+-+-+-+-+-+-+-+-+-+-+-+-+
   |                        Router Label N                         |
   +-+-+-+-+-+-+-+-+-+-+-+-+-+-+-+-+-+-+-+-+-+-+-+-+-+-+-+-+-+-+-+-+
```

FIG. 16

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                                                               |
+                                                               +
|                                                               |
+                        Router Label 1                         +
|                                                               |
+                                                               +
|                                                               |
+-+-+-+-+-+-+-+-+-+-+-+-+-+-+-+-+-+-+-+-+-+-+-+-+-+-+-+-+-+-+-+-+
|                                                               |
+                                                               +
|                                                               |
+                        Router Label 2                         +
|                                                               |
+                                                               +
|                                                               |
+-+-+-+-+-+-+-+-+-+-+-+-+-+-+-+-+-+-+-+-+-+-+-+-+-+-+-+-+-+-+-+-+
//                                                             //
//                                                             //
+-+-+-+-+-+-+-+-+-+-+-+-+-+-+-+-+-+-+-+-+-+-+-+-+-+-+-+-+-+-+-+-+
|                                                               |
+                                                               +
|                                                               |
+                        Router Label N                         +
|                                                               |
+                                                               +
|                                                               |
+-+-+-+-+-+-+-+-+-+-+-+-+-+-+-+-+-+-+-+-+-+-+-+-+-+-+-+-+-+-+-+-+
```

FIG. 17

LOOP DETECTION IN MULTIPROTOCOL LABEL SWITCHING

BACKGROUND

Multiprotocol label switching (MPLS) is used to route data between nodes of a network based on labels instead of network addresses, thereby avoiding complex address lookups in a routing table. The labels identify virtual links (or paths) between nodes rather than endpoints. A path begins at a label edge router (LER) that is an ingress router for the path and traverses one or more label switched routers (LSRs) before ending at an LER that is an egress router for the path. The ingress router prefixes a packet with a label stack including one or more labels that indicate next hops along the path, e.g., the ingress router pushes the label stack onto the packet. Packets in the same forwarding equivalence class (FEC) are bound to the same label and are forwarded along the same path. In response to receiving a packet, an LSR uses the label value in the topmost entry of the label stack to determine the next hop for the packet, e.g., using a lookup table. The LSR then performs operations on the label stack based on the information in the topmost entry. For example, the LSR can swap the topmost label with a new label. For another example, the LSR can push a new label on top of the existing label to encapsulate the packet in another layer of MPLS. For yet another example, if the LSR is the egress router for the MPLS tunnel associated with a topmost label, the LSR pops the topmost label from the packet.

The paths between the routers in the network are determined using link state protocols such as open shortest path first (OSPF), intermediate system-to-intermediate system (IS-IS), OSPFv3, and the like. The link state protocol floods the status of locally connected networks and links of the routers across the network. Each router in the network builds an identical copy of the network topology based on the status information and then independently computes the paths to every other router (and any advertised networks), using path algorithms such as Dijkstra's Shortest Path First (SPF) algorithm, which computes the shortest paths between the nodes in a graph that represents the routers in the network. The paths are associated with labels and referred to herein as "label switched paths (LSPs)." In response to the SPF computation, the routers program routing tables, e.g., to indicate next-hop routers for the paths to different egress routers. Consequently, the forwarding states of the dependent LSPs are aligned in forwarding information bases (FIBs) in the routers, which look up forwarding tables in the MPLS FIB to make forwarding decisions for incoming and outgoing MPLS packets.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

FIG. 13 is an example of a recorded route label stack (RRLS) according to some embodiments.

FIG. 14 is an example of an RRLS descriptor according to some embodiments.

FIG. 15 is an example of a router label stack for Type 0x1 according to some embodiments.

FIG. 16 is an example of a router label stack for Type 0x2 according to some embodiments.

FIG. 17 is an example of a router label stack for Type 0x3 according to some embodiments.

DETAILED DESCRIPTION

Figure 1:
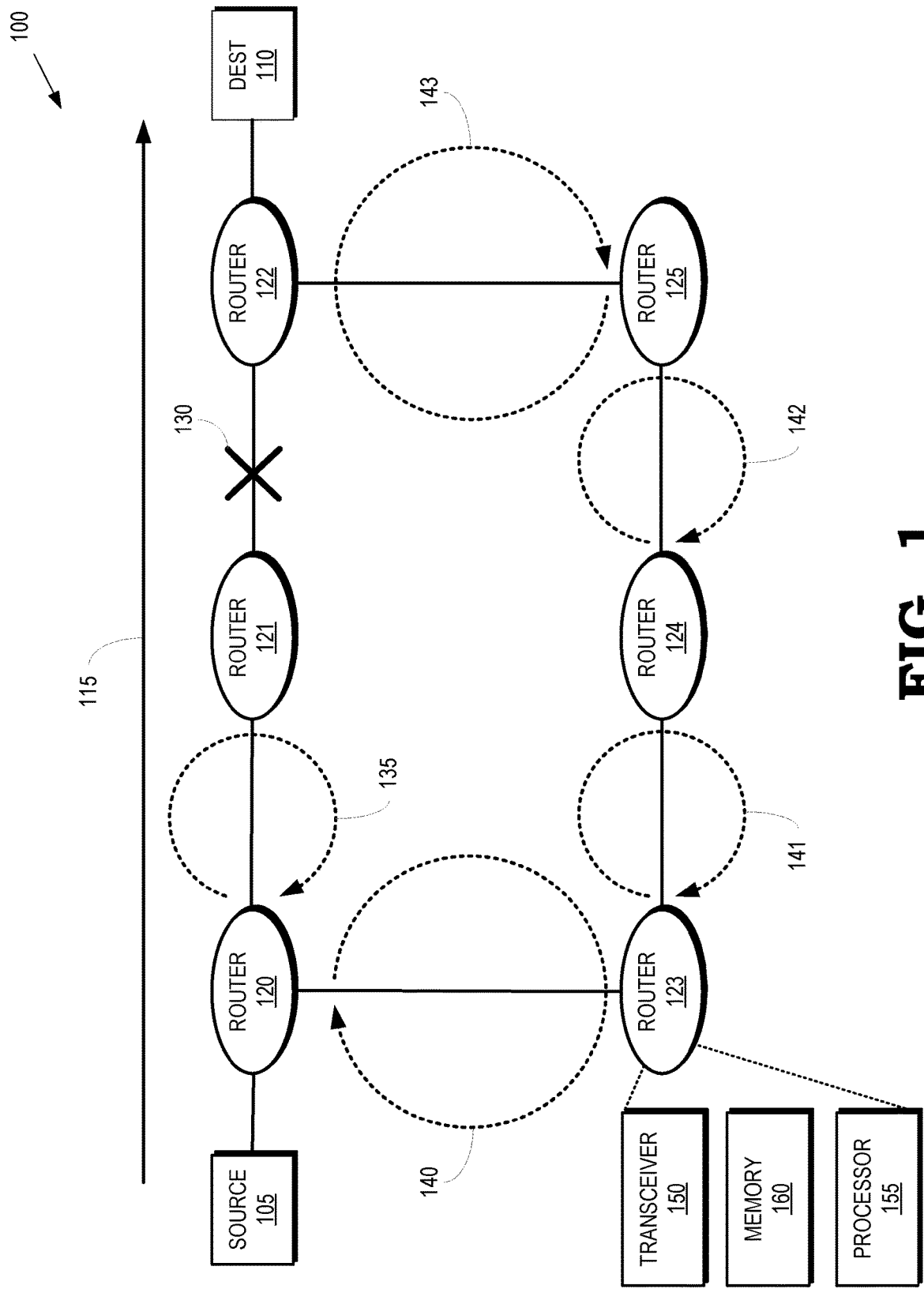
FIG. 1 is a block diagram of the communication system that supports loop detection among label switched routers (LSRs) according to some embodiments.

Inconsistencies or errors in the routing or forwarding tables can cause a packet to repeatedly traverse the same path (or loop). For example, a transient loop can occur in response to a topology change before convergence of a shortest path first (SPF) algorithm at all the routers in the network. Transient loops typically resolve in response to convergence of the SPF algorithm. For another example, faulty behavior of a router can create a permanent loop that routes packets along a previously traversed path. Permanent loops are resolved by repair or reconfiguration of one or more routers and packets in a permanent loop typically traverse the loop until expiration of their time-to-live (TTL) values. A micro-loop causes packets to loop back and forth between a pair of routers and a macro-loop traverses three or more routers. Looping packets amplify the traffic on links between the routers, which increases congestion on the links and consumes bandwidth that could be allocated to other packets. For example, in a permanent macro-loop of three routers, a packet having a TTL of 255 hops would make 85 rounds of the macro-loop before the TTL expires. The permanent macro-loop therefore amplifies bandwidth consumption on the links between the routers by a factor of 85. Conventional techniques for detecting loops are limited to non-critical failures in best-case topologies or detecting "u-turns" from a first router to a next hop second router and back to the first router.

FIGS. 1-29 disclose techniques for detecting looping labeled data packets in a network after a single micro or macro loop using a recorded route label stack (RRLS) in the packets. Examples of labeled data packets include MPLS labeled data packets that are transmitted in the forwarding or data plane. Labeled data packets are distinguished from control packets because control packets are transmitted in the control plane. The routers in the network are assigned labels that uniquely identify the routers within the network. Examples of labels include 20-bit labels that are assigned to the routers from a central database for the network, an Internet protocol (IPv4) address of the router, some or all of an IPv6 address of the router, and the like. The IPv6 protocol is an evolutionary upgrade to the IPv4 protocol that supports a larger number of connected hosts and a greater volume of data traffic. An ingress router of a label switched path (LSP) in the network pushes its label onto the RRLS of a packet and then forwards the packet to the next hop of the LSP. In response to receiving a packet, routers in the network examine the labels in the RRLS of the packet. If the receiving router does not find its own label in the RRLS, the receiving router pushes its label onto the RRLS and forwards the packet to the next hop of the LSP. If the receiving router detects its own label in the RRLS, which indicates that the packet has traversed a loop back to the receiving router after the first reception of the packet at the receiving router, the receiving router drops the packet. In some embodiments, the receiving router provides a loop detection notification that identifies the router and includes the RRLS to facilitate diagnosis and repair of the loop. In some embodiments, a hierarchy of router labels are used to identify loops at different levels of a hierarchy of overlay networks. For example, if a switched virtual private network (VPN) is implemented over an LSP level, a set VPN specific RRLS is used to detect loops in the switched VPN and a LSP specific RRLS is used to detect loops in the LSPs that interconnect nodes of the VPN. In some embodiments, loop detection is selectively enabled. For example, an ingress router can implement loop detection based on previously installed policies. If loop detection is enabled, the ingress router pushes a label onto the RRLS. Transit routers determine whether to use loop detection based on whether an RRLS stack is detected on incoming packets.

FIG. 1 is a block diagram of the communication system 100 that supports loop detection among label switched routers (LSRs) according to some embodiments. The communication system 100 provides communication pathways to convey packets from a source 105 to a destination 110, as indicated by the arrow 115. The source 105 and the destination 110 are implemented in one or more entities such as desktop computers, laptop computers, tablet computers, smart phones, Internet of Things (IoT) devices, and the like. The communication system 100 includes a set of routers 120, 121, 122, 123, 124, 125, which are collectively referred to herein as "the routers 120-125." In the illustrated embodiment, the routers 120-125 are implemented as LSRs in a multiprotocol label switched (MPLS) network.

Packets are conveyed from the source 105 to the destination 110 along a label switched path (LSP) that includes the routers 120-122. In the illustrated embodiment, a link between the router 121 and the router 122 fails, as indicated by the cross 130. In response to failure of the link, the router 121 sends a link state update that informs the routers 120-125 that the link has failed. The SPF algorithm implemented in the routers 120-125 eventually determines that the shortest path from the source 105 to the destination 110 is from the router 120 to the router 122 via the routers 123-125. However, the SPF algorithm takes a finite amount of time to converge at the routers 120-125 and does not necessarily converge at the same time at all the routers 120-125, which can result in the routers 120-125 forwarding packets on a LSP along an inconsistent path.

Loops form between the routers 120-125 while the SPF algorithms are converging at the routers 120-125. For example, if the SPF algorithm at the router 121 converges before the SPF algorithm at the router 120, the router 120 continues to forward packets to the router 121 (along the original shortest path) and the router 121 forwards the packets back to the router 120 (along the new shortest path), thereby forming a loop 135. In response to the SPF algorithm converging at the router 120, the router 120 forwards packets to the router 123. However, if the SPF algorithm has not yet converged at the router 123, the router 120 forwards packets to the router 123 (along the new shortest path) and the router 123 forwards the packets back to the router 120 (along the original shortest path) thereby forming a loop 140. In a similar manner, loops 141, 142, 143 can form while the SPF algorithm is converging at the routers 122, 124, 125. The loops 135, 140-143 form between pairs of routers 120-125 and are therefore referred to herein as micro-loops. The duration of the loops is proportional to the time required to propagate the topology change through the network, as well as the time required for the SPF algorithm to converge at the routers 120-125 and for the routers 120-125 to update the routing tables and align their MPLS FIB.

Some embodiments of the communication system 100 implement fast rerouting of MPLS packets along alternate paths that are used in the event of a failure along a primary path. In order to avoid forwarding loops, the routers 120-125 run additional calculations to verify that a candidate alternate path doesn't create a forwarding loop, in which case the alternate path is referred to as a loop free alternate (LFA) path. The routers 120-125 calculate LFA paths in advance and store them in a routing table so that the LFA paths are available in the event of a failure along a primary path.

Some embodiments of the routers 120-125 include a transceiver that is used to receive and transmit packets, a memory to store information, and a processor to execute instructions. For example, the router 123 is implemented using a transceiver 150 for receiving and transmitting packets. The router 123 also includes a processor 155 and a memory 160. The processor 155 executes instructions stored in the memory 160 and stores information in the memory 160 such as the results of the executed instructions.

Figure 2:
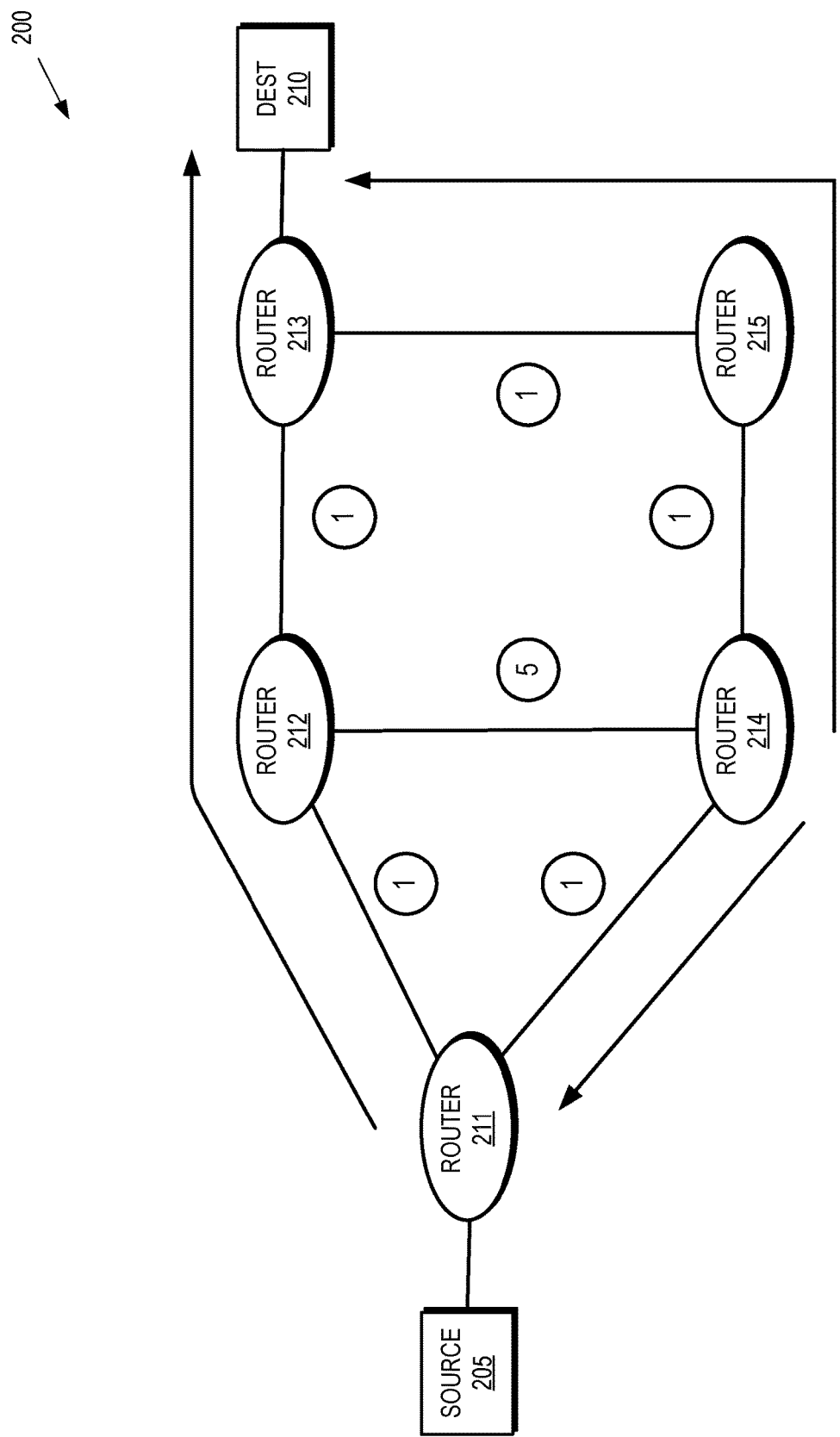
FIG. 2 is a block diagram of a communication system that uses alternate paths that avoid generating loops in the event of a link failure according to some embodiments.

FIG. 2 is a block diagram of a communication system 200 that uses alternate paths to avoid generating loops in the event of a link failure according to some embodiments. The communication system 200 provides communication pathways to convey packets from a source 205 to a destination 210 via a set of routers 211, 212, 213, 214, 215, which are collectively referred to herein as "the routers 211-215." In the illustrated embodiment, the routers 211-215 are implemented as LSRs in a multiprotocol label switched (MPLS) network. The communication system 200 therefore represents some embodiments of the communication system 100 shown in FIG. 1.

The routers 211-215 determine paths between the source 205 and the destination 210 based upon weights or metrics associated with links between the routers 211-215, which are indicated by the numbers in the circles adjacent the links. For example, the metric associated with the link between the router 211 and the router 212 is one and the metric associated with the link between the router 212 and the router 214 is five. The router 211 determines that the shortest path includes the routers 211-213 at a total cost of two. The path including the routers 211-213 is therefore the primary path from the source 205 to the destination 210. The router 211 determines that the alternate path from router 211 to router 214 to router 215 to router 213 is loop free because the shortest path from the router 214 to the router 213 does not include the router 211. Consequently, traffic sent by the router 211 to the back up next hop router 214 is not routed back to the router 211. The router 211 therefore programs the LSP to the router 213 into the MPLS FIB with the router 212 as the primary next hop and the router 214 as the alternate next hop. In the event of a failure of a link between the router 211 and the router 212, the router 211 fast reroutes packets on the LSP via the backup next hop 214. Some embodiments of the router 214 compute an alternate path to router 213 to protect against failure of its primary path to router 213. The router 214 determines that the alternate path from router 214 to router 211 to router 212 to router 213 is loop free because the shortest path from router 211 to router 213 does not include the router 214. Consequently, traffic sent by the router 214 to the back up next hop router 211 is not routed back to the router 214. The router 214 therefore programs the LSP to the router 213 into the MPLS FIB with the router 215 as the primary next hop and the router 211 as the alternate next hop. In the event of a failure of a link between the router 214 and the router 215, the router 214 fast reroutes packets on the LSP via the backup next hop 211.

Figure 3:
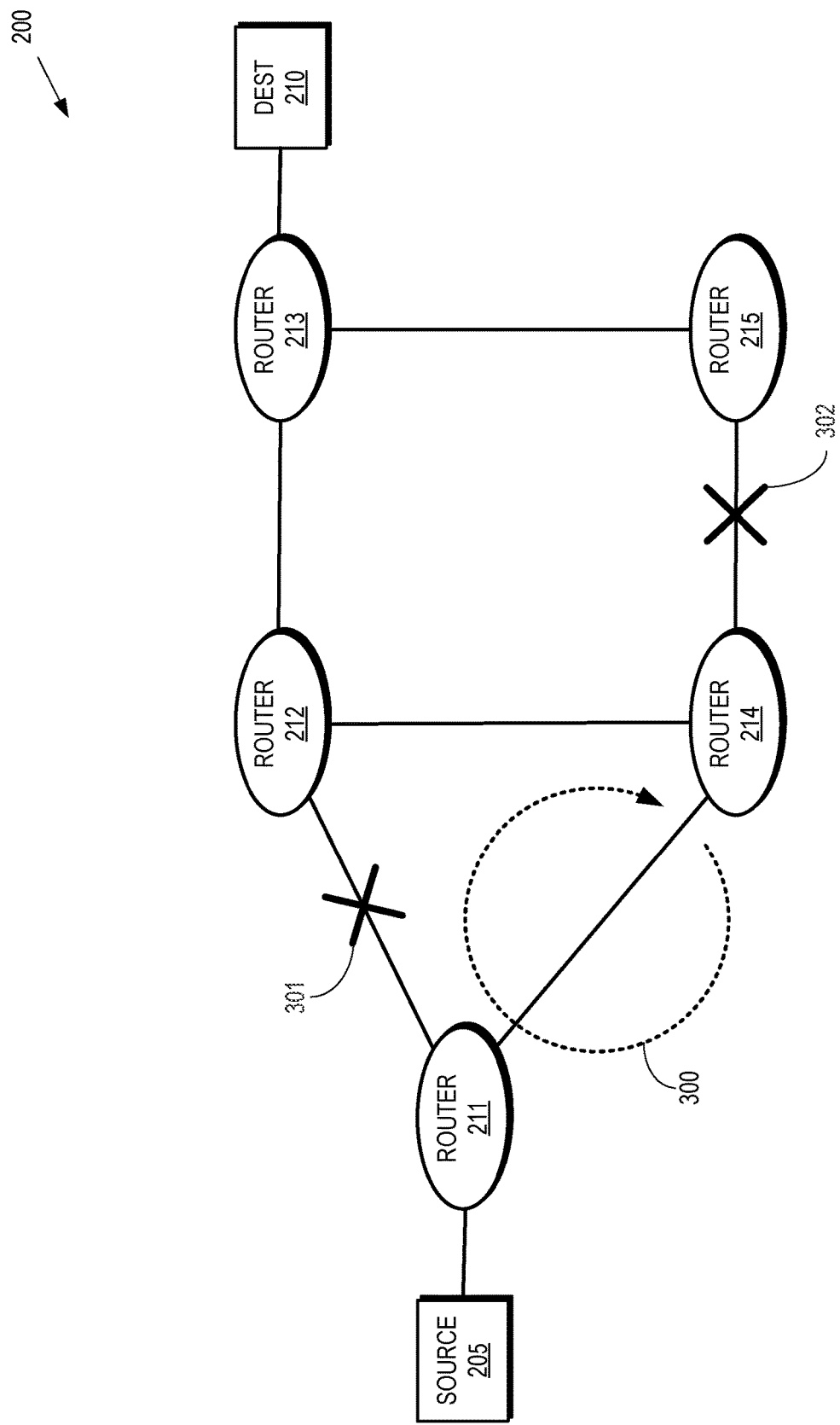
FIG. 3 is a block diagram of the communication system during concurrent failure of multiple links according to some embodiments.

FIG. 3 is a block diagram of the communication system 200 during concurrent failure of multiple links according to some embodiments. In the illustrated embodiment, the link between the router 211 and the router 212 fails concurrently with the link between the router 214 and the router 215, as indicated by the crosses 301, 302. Thus, both the primary path and the alternate path that were previously calculated using the SPF algorithms in the routers 211-215 are interrupted by the concurrent link failures. Failure of the link between the router 211 and the router 212 causes the router 211 to fast reroute packets along the alternate path to the next hop router 214. However, failure of the link between the router 214 and the router 215 causes the router 214 to fast reroute packets along the alternate path to the next hop router 211. A loop 300 is therefore formed between the router 211 and the router 214 due to the multiple link failures. The loop 300 persists until the SPF algorithms executed by the routers 211-215 converge to a new solution in the presence of the link failures, e.g., a new shortest path from the source 205 to the destination 210 that conveys packets along a path from the router 211 to the router 214 to the router 212 to the router 213.

Figure 4:
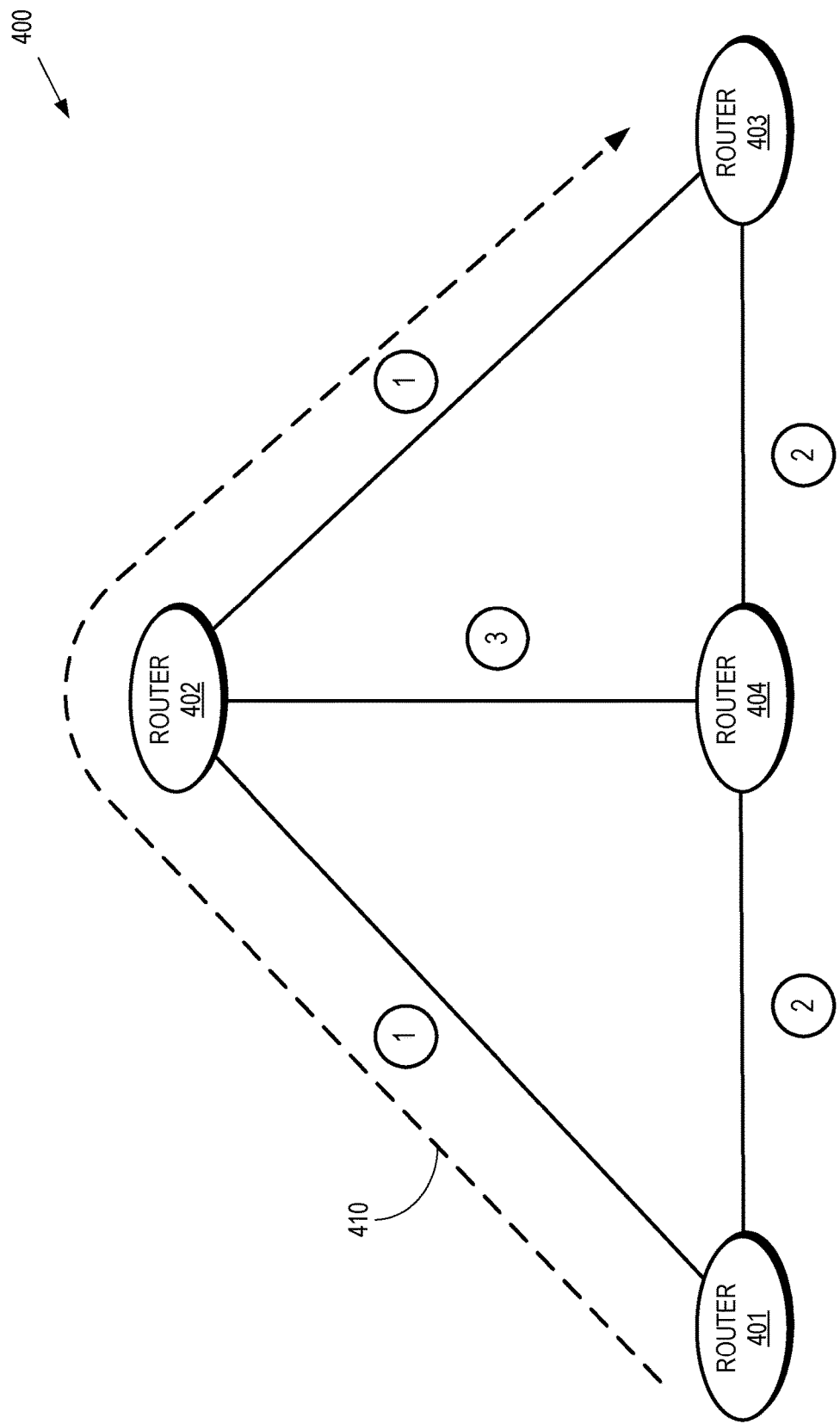
FIG. 4 is a block diagram of a communication system that determines a primary shortest path and an alternate shortest path using a shortest path first (SPF) algorithm according to some embodiments.

FIG. 4 is a block diagram of a communication system 400 that determines a primary shortest path and an alternate shortest path using a shortest path first (SPF) algorithm according to some embodiments. The communication system 400 includes routers 401, 402, 403, 404, which are collectively referred to herein as "the routers 401-404." In the illustrated embodiment, the router 401 is a source router that is connected to a source (such as the source 105 shown in FIG. 1 and the source 205 shown in FIG. 2) and the router 403 is a destination router that is connected to a destination (such as the destination 110 shown in FIG. 1 and the destination 210 shown in FIG. 2). The metrics or costs of the links are indicated in the circled numerals. For example, the cost of the link between the router 401 and the router 402 is one and the cost of the link between the router 402 and the router 404 is three.

The routers 401, 402, 404 compute the primary and alternate shortest paths to the destination router 403 based on the metrics or costs. The router 401 computes a primary path that includes the routers 401, 402, 403 (at a cost of two) and an alternate path that includes the routers 401, 404, 403 (at a cost of four). The primary path from the router 401 to the router 403 as indicated by the arrow 410. The router 402 computes a primary path that includes the routers 402, 403 (at a cost of one) and an alternate path that includes the routers 402, 404, 403 (at a cost of five). The router 404 computes a primary path that includes the routers 404, 403 (at a cost of two) and an alternate path that includes the routers 404, 401, 402, 403 (at a cost of four).

Figure 5:
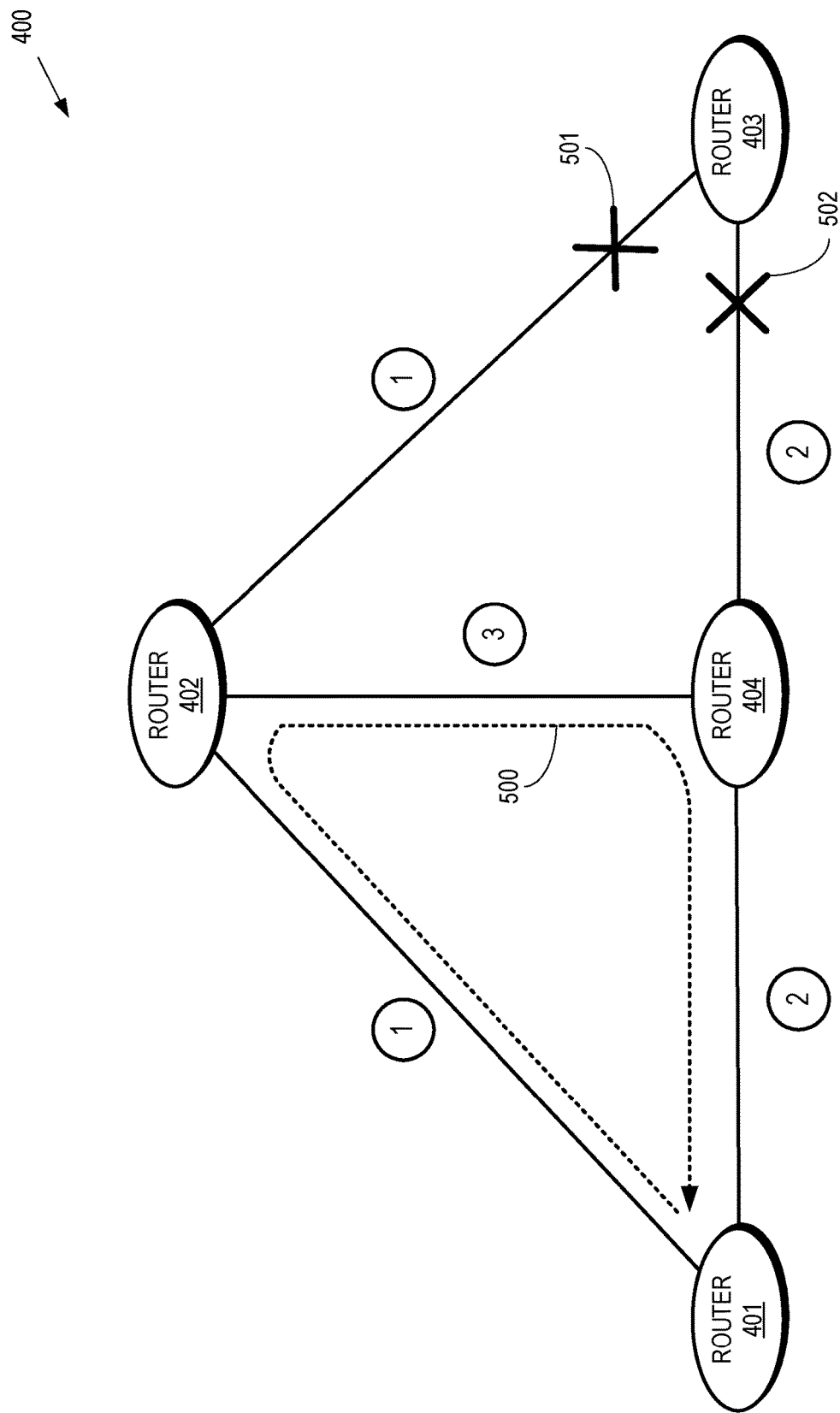
FIG. 5 is a block diagram of the communication system that forms a macro-loop in response to concurrent failure of multiple links according to some embodiments.

FIG. 5 is a block diagram of the communication system 400 that forms a macro-loop 500 in response to concurrent failure of multiple links according to some embodiments. In the illustrated embodiment, the link between the router 402 and the router 403 fails concurrently with the link between the router 404 and the router 403, as indicated by the crosses 501, 502. In response to receiving a packet from the router 401, the router 402 detects the failure of the link to the router 403 and reroutes the received packet via its previously calculated alternate path to the next hop router 404. In response to receiving the packet from the router 402, the router 404 detects the failure of the link to the router 403 and reroutes the received packet via its previously calculated alternate path to the router 401, which forwards the packet via its primary path to the router 402, thereby forming a macro-loop 500 including the routers 401, 402, 404. In this case, the macro-loop 500 resolves in response to convergence of the SPF algorithm at the routers 401-404 following the link failures.

Macro-loops also form in the communication system 400 in non-failure scenarios. For example, if the routers 401, 404 incorrectly compute the shortest paths or incorrectly update the MPLS FIBs based on a correctly computed shortest path, the macro-loop 500 can form in the communication system 400. In response to receiving a packet from the router 401, the router 402 forwards the received packet based on the incorrectly calculated or stored shortest path to the next hop router 404. In response to receiving the packet from the router 402, the router 404 forwards the received packet based on the incorrectly calculated or stored shortest path to the router 401, which forwards the packet via its primary path to the router 402, thereby forming the macro-loop 500 including the routers 401, 402, 404. In this case, the macro-loop 500 is not transient and may not be resolved without intervention.

Figure 6:
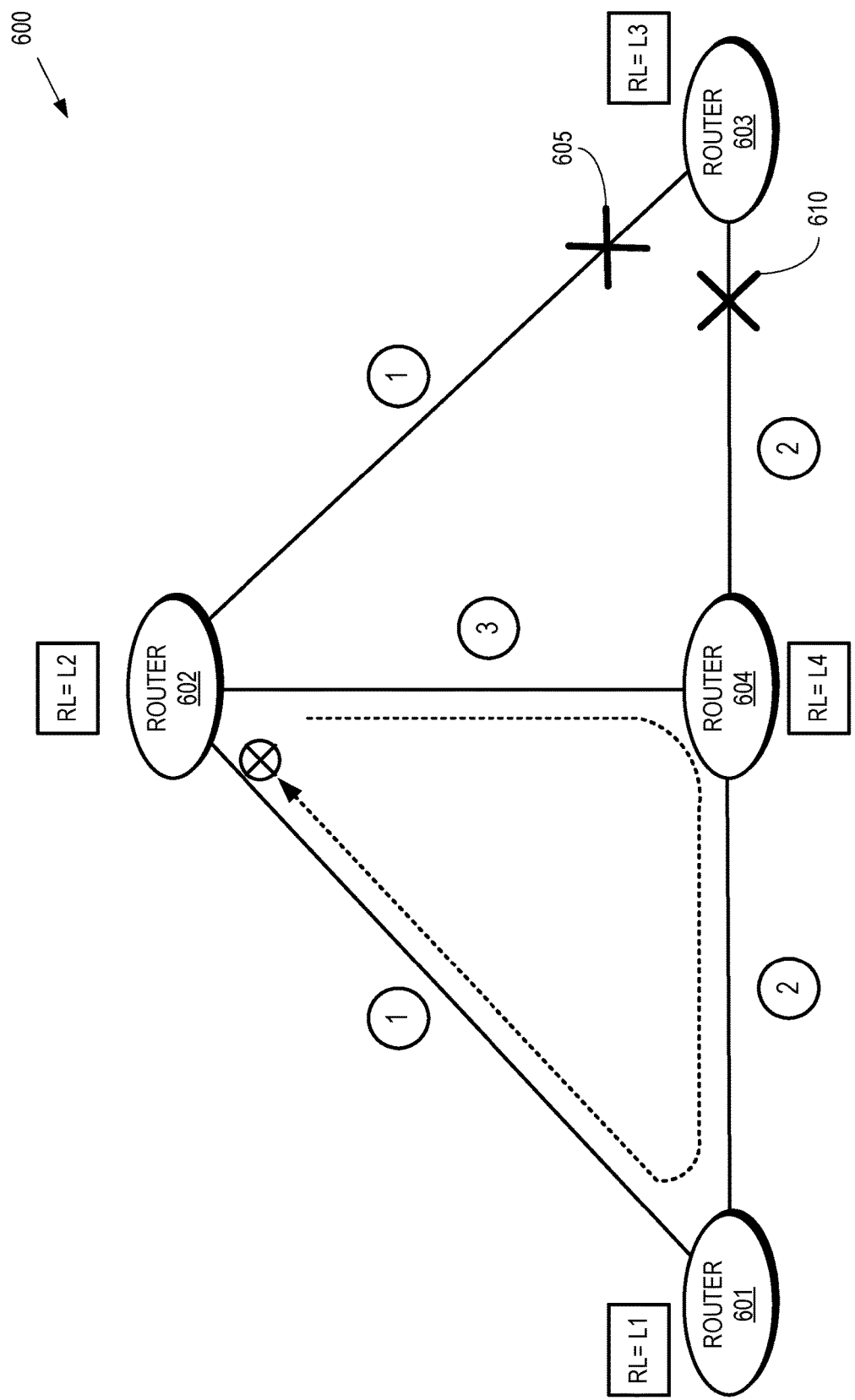
FIG. 6 is a block diagram of a communication system that performs loop detection based on unique identifiers of routers in the communication system according to some embodiments.

FIG. 6 is a block diagram of a communication system 600 that performs loop detection based on unique identifiers of routers in the communication system 600 according to some embodiments. The communication system 600 includes routers 601, 602, 603, 604, which are collectively referred to herein as "the routers 601-604." In the illustrated embodiment, the router 601 is a source router that is connected to a source (such as the source 105 shown in FIG. 1 and the source 205 shown in FIG. 2) and the router 603 is a destination router that is connected to a destination (such as the destination 110 shown in FIG. 1 and the destination 210 shown in FIG. 2). The metrics or costs of the links are indicated in the circled numerals. For example, the cost of the link between the router 601 and the router 602 is one and the cost of the link between the router 602 and the router 604 is three.

The routers 601-604 use an SPF algorithm to compute a shortest path from the source router 601 to the destination routers 603 based on the metrics or costs of the links. In the illustrated embodiment, the shortest path includes the routers 601-603, e.g., the shortest path corresponds to the path 410 shown in FIG. 4. The shortest path is an LSP and so the routers 601-604 advertise labels associated with the path. For example, the router 601 advertises a label L3-1 as the label for the LSP from the router 601 to the router 603, the router 602 advertises a label L3-2 for the portion of the LSP from the router 602 to the router 603, and the router 603 advertises a label L3-3 for the LSP from the router 601 to the router 603. In order for a packet {P} to traverse the LSP from the router 601 to the router 603, the router 601 pushes the label L3-2 advertised by the router 602 onto the packet {P} and forwards the packet {L3-2, P} to the router 602. In response to receiving the packet {L3-2, P}, the router 602 swaps the incoming label L3-2 with the label L3-3 advertised by the router 603 and sends the packet {L3-3, P} to the router 603. In response to receiving the packet {L3-3, P}, the router 603 pops the label L3-3 from the packet because the router 603 terminates the LSP.

Each of the routers 601-604 is configured with an identifier that uniquely identifies the corresponding router 601-604 within the communication system 600. In the illustrated embodiment, the router 601 is assigned the unique identifier L1, the router 602 is assigned a unique identifier L2, the router 603 is assigned the unique identifier L3, and the router 604 is assigned the unique identifier L4. The unique identifiers are referred to as router labels (RL), which can be assigned to the routers 601-604 from a central database for the communication system 600 or the RLs can be set equal to (or derived from) Internet protocol (IPv4) addresses of the routers 601-604 or the IPv6 addresses of the routers 601-604. The routers 601-604 push their unique identifiers onto a stack of router labels that is referred to herein as a recorded route label stack (RRLS) so that the RRLS in a packet indicates the set of routers that have processed the packet as the packet traversed the path to the current router. For example, the RRLS of a packet that traversed a path from the router 601 to the router 602 to the router 603 includes the values {L3, L2, L1}. The router labels are pushed onto the RRLS in reverse order. The RRLS is used to perform loop detection in a corresponding LSP and the RRLS is encoded on top of the label for the LSP.

The routers 601-604 perform loop detection based on the RRLS in packets received at the routers 601-604. In some embodiments, loop detection is enabled or disabled based on a user configuration, a policy, and the like. In response to receiving a packet, the routers 601-604 scan the router labels in the RRLS to check for the presence of the router label that uniquely identifies the receiving router. If a router identifies its own router label in the RRLS, the router determines that the packet previously traversed the receiving router and there is a loop in the communication system 600. The receiving router therefore drops the packet. In some embodiments, the receiving router generates a loop detection notification to a reporting entity. The notification can include a copy of the draft packet, the router label of the receiving router, the RRLS of the received packet, or other information. The reporting entity uses the information in the loop detection notification to identify the loop path, e.g., by tracing back the router labels in the RRLS to find the recurrence of the topmost router label. If the router label of the receiving router is not found in the RRLS of the received packet, the receiving router makes a forwarding decision based on a label beneath the RRLS. If the label indicates that the receiving router is the egress router, the RRLS and the underlying label are popped and the receiving router makes a further forwarding decision based on the context associated with the label. If the label indicates that the packet is to be forwarded, the receiving router swaps the incoming label of the LSP with the outgoing label of the LSP to the next hop router. The receiving router also pushes its router label onto the RRLS and then forwards the packet to the designated next hop.

Some embodiments of the routers 601-604 are configured so that the unique identifiers are not pushed onto the RRLS for a packet as long as the packet is being forwarded along the primary path. Loop detection is only enabled in response to one of the routers 601-604 forwarding the packet along an alternate path, as discussed herein.

In the illustrated embodiment, the link between the router 602 and the router 603 fails concurrently with the link between the router 604 and the router 603, as indicated by the crosses 605, 610. In response to receiving a packet from the router 601, the router 602 detects the failure of the link to the router 603 and fast reroutes the received packet via its previously calculated alternate path to the next hop router 604. Loop detection is therefore enabled and so the router 602 pushes its unique router label L2 onto the RRLS of the packet prior to forwarding the packet to the next hop router 604. The contents of the packet therefore include {RRLS={L2}, L3-3, P1}, where L3-3 is the label of the LSP advertised by the router 604 and P1 is the original packet.

In response to receiving the packet from the router 602, the router 604 detects the presence of the RRLS and checks for the presence of its unique router label L4 in the RRLS. The router 604 does not find the router label L4 in the RRLS.

The router 604 detects the failure of the link to the router 603 and makes a forwarding decision based upon the LSP label in the packet, which in this case is L3-3. The router 604 then fast reroutes the received packet via its previously calculated alternate path to the router 601. The router 604 pushes its unique router label L4 onto the RRLS of the packet prior to forwarding the packet to the next hop router 601. The contents of the packet therefore include {RRLS={L4, L2}, L4-1, P1}, where L4-1 is the label of the LSP to the router 601.

In response to receiving the packet from the router 604, the router 601 detects the presence of the RRLS and checks for the presence of its unique router label L1 in the RRLS. The router 601 does not find the router label L1 in the RRLS. The router 601 pushes its unique router label L1 onto the RRLS and forwards the received packet via its previously calculated primary path to the router 602. The contents of the packet therefore include {RRLS={L1, L4, L2}, L4-2, P1}, where L4-2 is the label of the LSP to the router 602.

In response to receiving the packet from the router 601, the router 602 checks for the presence of its unique router label L2 in the RRLS. The router 604 detects the router label L2 in the RRLS and consequently the received packet is dropped, thereby preventing looping of the packet. In some embodiments, a loop detection notification is transmitted by the router 602 to a reporting entity (not shown). The loop detection notification includes a copy of the received packet. The router 602 also pushes its router label L2 onto the RRLS so that the reporting entity receives the packet {RRLS={L2, L1, L4, L2}, L4-2, P1}. The reporting entity traces back the RRLS to find the recurrence of the topmost router label L2, which allows the reporting entity determined that the loop is indicated by L2→L4→L1→L2, which indicates a loop from the router 602 to the router 604 to the router 601 and back to the router 602.

Some embodiments of the communication system 600 enable loop detection by default. For example, if the operator of the communication system 600 intends to protect against loops created by misbehavior of the routers 601-604, and the ingress router 601 is configured to push and RRLS onto each packet so that each subsequent router along the path of the packet scans the RRLS to check for a loop and then selectively pushes its router label onto the RRLS prior to forwarding the packet or drops the packet, as discussed herein. The routers 601-604 can also determine the path traversed by the packet using the router labels without necessarily performing loop detection. Loop detection can be selectively enables based upon the expected overhead. For example, if the maximum number of routers traversed by a packet is 15, the maximum overhead of an RRLS on a packet is approximately 60 bytes when the packet reaches the last router. An operator of the communication system 600 can therefore enable loop detection by default or in response to rerouting based on the expected overhead. Test packets can be injected into the routers 601-604 of the communication system 600 to identify looping paths. Loop detection can also be performed independently at different levels of a network hierarchy.

Figure 7:
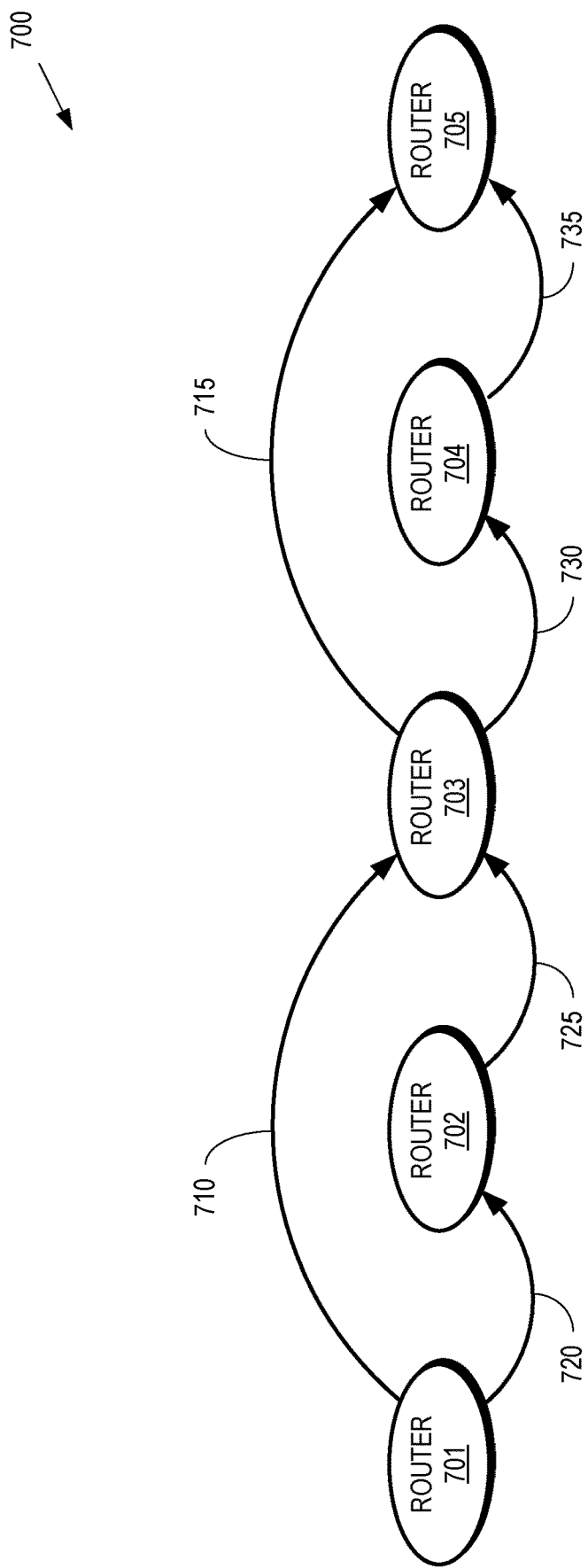
FIG. 7 is a block diagram of a communication system that includes a set of routers that support multiple levels in a hierarchy of nested LSPs according to some embodiments.

FIG. 7 is a block diagram of a communication system 700 that includes a set of routers that support multiple levels in a hierarchy of nested LSPs according to some embodiments. One example of a nested LSP hierarchy is a switched virtual private network (VPN) that is implemented over sets of routers that are linked by LSPs. The VPN includes multiple interconnected VPN nodes. Another example of a nested LSP hierarchy including nodes that are enabled over a gateway protocol (BGP) network that is implemented over LSP that is implemented over resource Reservation protocol (RSVP). Yet another example of a nested LSP hierarchy includes VPN nodes that are implemented over a BGP network that is implemented over LSP and RSVP. The number of levels in the hierarchy, as well as the protocols used to implement the different levels, who different in different embodiments of the communication system 700.

In the illustrated embodiment, the communication system 700 includes routers 701, 702, 703, 704, 705 that are collectively referred to herein as "the routers 701-705." The routers 701-705 supports two levels of an MPLS hierarchy of nested LSPs. The first, higher level includes a first LSP that supports a path between the router 701, the router 703, and the router 705. The portion 710 of the path is labeled with the label L11 and the portion 715 of the path is labeled with the label L12. The second, lower, level includes a second LSP that supports a path between the routers 701-703 and a third LSP that supports a path between the routers 703-705. One portion 720 of the path of the second LSP is labeled with the label L21 and another portion 725 of the path of the second LSP is labeled with the label L22. One portion 730 of the path of the third LSP is labeled with the label L31 and another portion 735 of the path of the third LSP is labeled with the label L32.

Packets are transmitted using the two levels of the MPLS hierarchy by pushing corresponding labels onto the transmitted packets. To send a packet (P1) on the portion 710 of the first LSP, the router 701 pushes the label L11 onto the packet to form the packet {L11, P1} and forwards the packet to the router 703. The router 703 swaps the incoming label L11 with the outgoing label L12 and forwards the packet to the router 705 in the format {L12, P1}. The routers 701, 703, 705 on the path of the first LSP 710 are not directly connected so the packet is overlaid on the second level of the MPLS hierarchy to reach the necessary next hops. For example, between the routers 701, 703, the LSP 710 is overlaid on the portions 720 and 725 of the third LSP. Thus, the packet is sent by the router 701 as {L21, L11, P1} to the router 702, which swaps the incoming label L21 of the second LSP with the outgoing label L22 of the second LSP and forwards the packet {L22, L11, P1} to the router 703.

The router 703 terminates the second LSP and therefore pops the label L22 because the second LSP terminates at the router 703. The router 703 makes forwarding decisions for the packet based on the first LSP label L11. In the illustrated embodiment, the router 703 swaps the incoming label L11 of the first LSP with the outgoing label L12 of the first LSP to the router 705. Since the router 705 is not directly connected to the router 703, the router 703 encapsulates the packet using the label of the third LSP that terminates at the router 705, e.g., to form the packet {L31, L12, P1}. The packet is then forwarded towards the router 705, as discussed above.

In the illustrated embodiment, the first, second, and third LSPs at the first and second levels of the MPLS hierarchy enabled detection of loops. The transmitted packets therefore have separate RRLS for the different levels of the MPLS hierarchy, which are denoted RRLS-1 for the first level and RRLS-2 for the second level. The routers 701-705 are assigned identifiers L1, L2, L3, L4, L5, respectively, which uniquely identify the routers 701-705 within the communication system 700. When transmitting a packet, the router 701 pushes the RRLS-1 for the first LSP after pushing the label for the first LSP, e.g., to form the packet {RRLS-1={L1}, L11, P1}. The router 701 then pushes the RRLS-2 for the second LSP after pushing the label for the second LSP to form the packet {RRLS-2={L1}, L21, RRLS-1={L1}, L11, P1}, which is transmitted to the router 702.

The router 702 checks for a loop based on RRLS-2, pushes its router label L2 into RRLS-2, swaps the label L21 of the second LSP with outgoing label L22 to routers 703, and the resultant packet {RRLS-2={L1, L2}, L22, RRLS-1={11}, L11, P1} is sent to the router 703. The router 703 checks for a loop in the RRLS-2. The router 703 pops RRLS-2 and L22 since it is termination of the second LSP. The router 703 finds the RRLS-1 after popping the RRLS-2 and L22, checks for a loop based on the RRLS-1, inserts its router label L3 into RRLS-1 and swaps the label L11 with the outgoing label L12 to the router 705. The resultant packet {RRLS-1={L1, L3}, L12, P1} is sent over the third LSP. The router 703 pushes the RRLS-3 for the third LSP after pushing the label for the third LSP. The resultant packet {RRLS-3={L3}, L31, RRLS-1={L1, L3}, L12, P1} is sent to the router 704. Similar steps are repeated until the packet is forwarded to the router 705.

Figure 8:
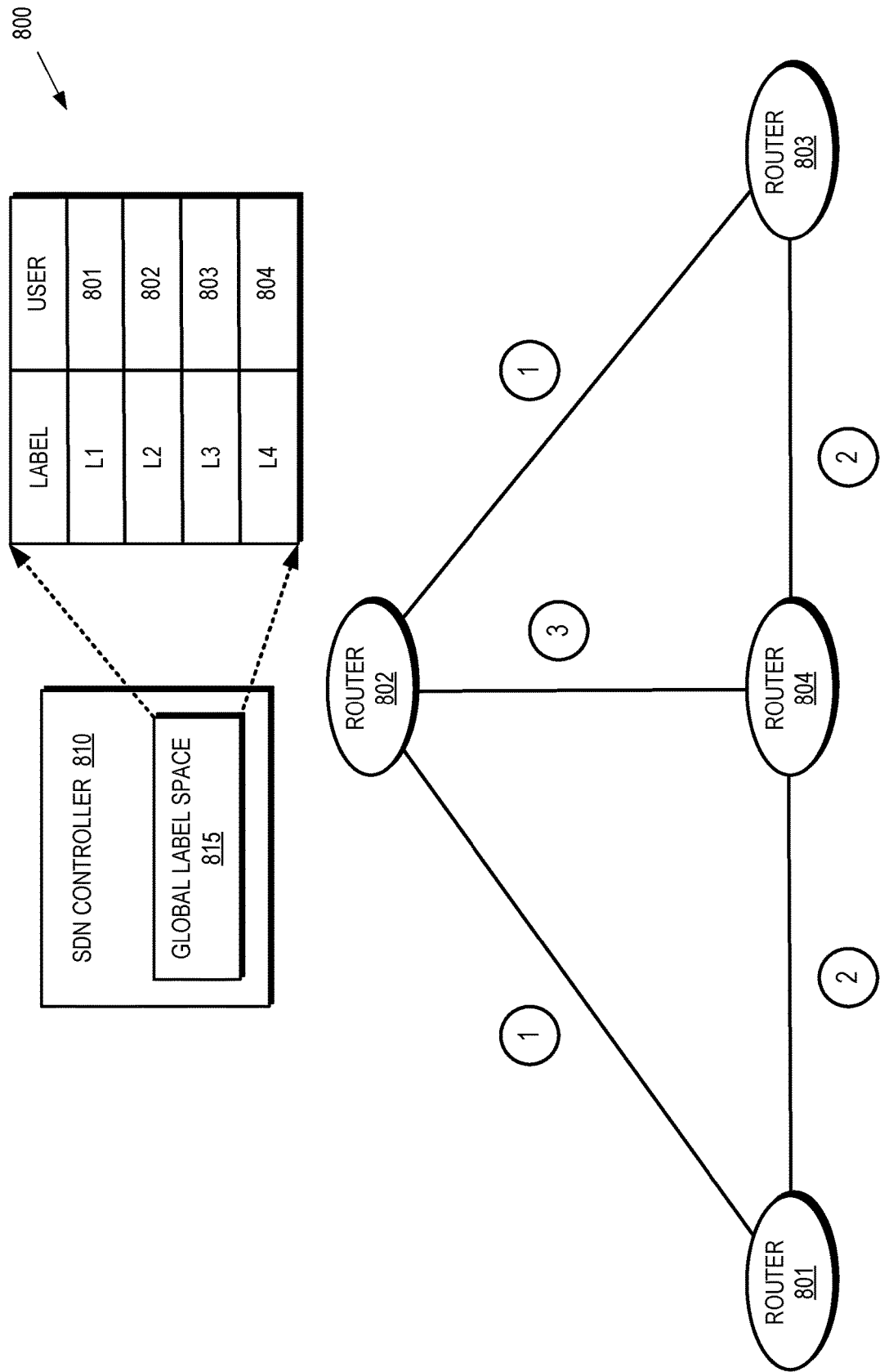
FIG. 8 is a block diagram of a communication system that assigns unique identifiers to routers from a global label space according to some embodiments.

FIG. 8 is a block diagram of a communication system 800 that assigns unique identifiers to routers from a global label space according to some embodiments. The communication system 800 includes routers 801, 802, 803, 804, which are collectively referred to herein as "the routers 801-804." In the illustrated embodiment, the router 801 is a source router that is connected to a source (such as the source 105 shown in FIG. 1 and the source 205 shown in FIG. 2) and the router 803 is a destination router that is connected to a destination (such as the destination 110 shown in FIG. 1 and the destination 210 shown in FIG. 2). The metrics or costs of the links are indicated in the circled numerals. For example, the cost of the link between the router 801 and the router 802 is one and the cost of the link between the router 802 and the router 804 is three.

The communication system 800 includes a centralized software defined networking (SDN) controller 810 that oversees the communication system 800. The SDN controller 810 includes (or has access to) a global label space 815 that is implemented using memory internal to SDN controller 810 or external to the SDN controller 810. In some embodiments, the global label space 815 is hosted by a centralized network management server (NMS), a path computation element (PCE) server, and the like. The SDN controller 810 assigns or allocates labels to the routers 801-804. The assignments were allocations are stored in the global label space 815. A first column in the global label space 815 indicates values of the labels and a second column in the global label space 815 indicates the user that has been assigned are allocated the label. For example, the label L1 is assigned to the router 801, the label L2 is assigned to the router 802, the label L3 is assigned to the router 803, and the label L4 is assigned to the router 804. Assigning or allocating the labels to the routers 801-804 includes providing the labels from the SDN controller 810 to the corresponding routers 801-804.

Figure 9:
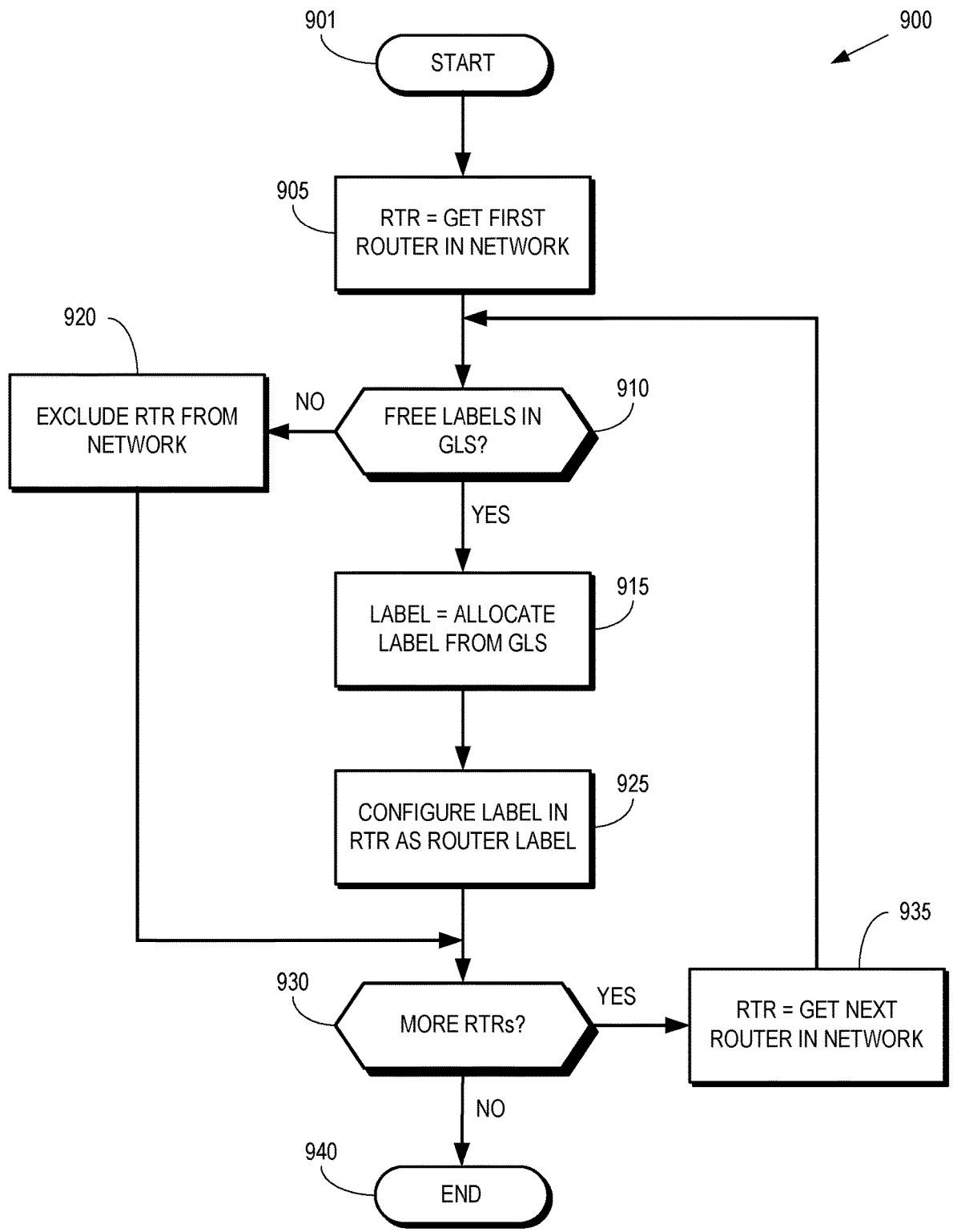
FIG. 9 is a flow diagram of a method of configuring router labels that are allocated from a global label space according to some embodiments.

FIG. 9 is a flow diagram of a method 900 of configuring router labels that are allocated from a global label space according to some embodiments. The method 900 is implemented in some embodiments of the communication system 100 shown in FIG. 1, the communication system 600 shown in FIG. 6, the communication system 700 shown in FIG. 7, and the communication system 800 shown in FIG. 8. Some embodiments of the method 900 are implemented in a controller such as the SDN controller 810 shown in FIG. 8.

The method 900 begins at the block 901. At the block 905, the controller retrieves the identity of the first router in the MPLS network. At decision block 910, the controller determines whether the global label space includes one or more free labels, e.g., labels that are unallocated or unassigned in any context. If the global label space includes at least one free label, the method 900 flows to block 915. If the global label space does not include any free labels because the labels have all been assigned to other routers, the method 900 flows to block 920.

At block 915, the controller allocates (or assigns) a label from the global label space to the current router. At block 925, the controller transmits one or more messages to the current router including information that the current router uses to configure the label as its router label. In response to receiving the message, the current router configures itself to use the received label as its router label, e.g., by storing the router label in a local memory or database. The method 900 then flows to decision block 930.

At block 920, the controller excludes the current router from the network due to the exhaustion of labels in the global label space because assigning a previously assigned label to the current router would result in a non-unique label for the routers that share the label. The method 900 then flows to decision block 930.

At decision block 930, the controller determines whether there are more routers that need to be allocated or assigned labels. If so, the method 900 flows to block 935 and the controller retrieves the identity of another router in the MPLS network, which becomes the current router for the controller. The method 900 then flows to decision block 910. If there are no more routers that require allocation or assignment of labels in the network, the method 900 flows to block 940 and the method 900 ends.

Figure 10:
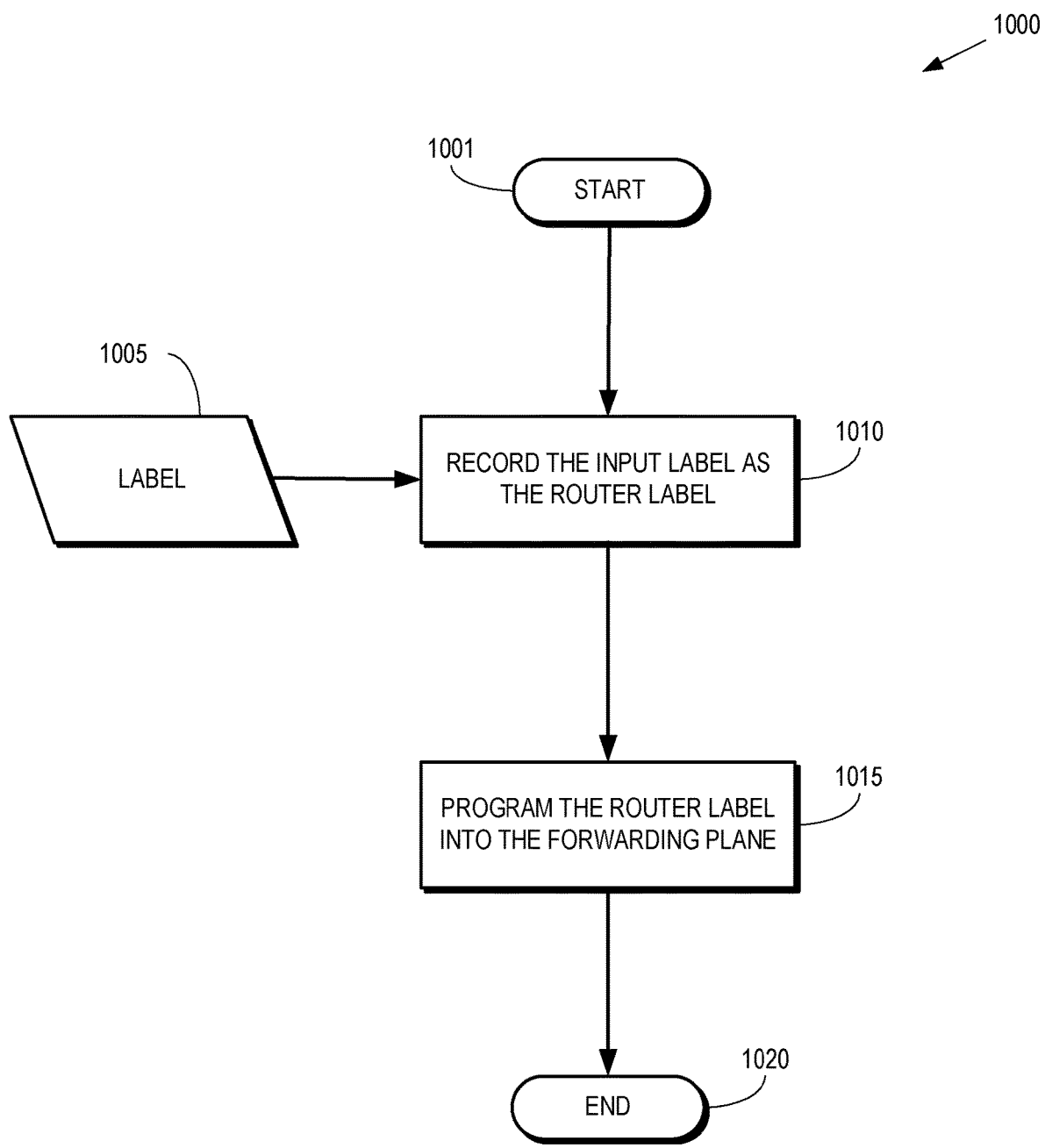
FIG. 10 is a flow diagram of a method of configuring a router with a router label provided by a controller according to some embodiments.

FIG. 10 is a flow diagram of a method 1000 of configuring a router with a router label provided by a controller according to some embodiments. The method 1000 is implemented by routers in some embodiments of the communication system 100 shown in FIG. 1, the communication system 600 shown in FIG. 6, the communication system 700 shown in FIG. 7, and the communication system 800 shown in FIG. 8.

The method 1000 begins at block 1001. At the input block 1005, the router receives the label provided by the controller. At block 1010, the router records the input label as the router label assigned to the router. In some embodiments, the router stores the router label in a memory or database implemented in the router. At block 1015, the router programs the router label into the forwarding plane so that the forwarding plane refers to the router label when originating an RRLS (e.g., when the router is an ingress router for a packet) or processing received packets that include an RRLS. The method 1000 ends at block 1020.

Figure 11:
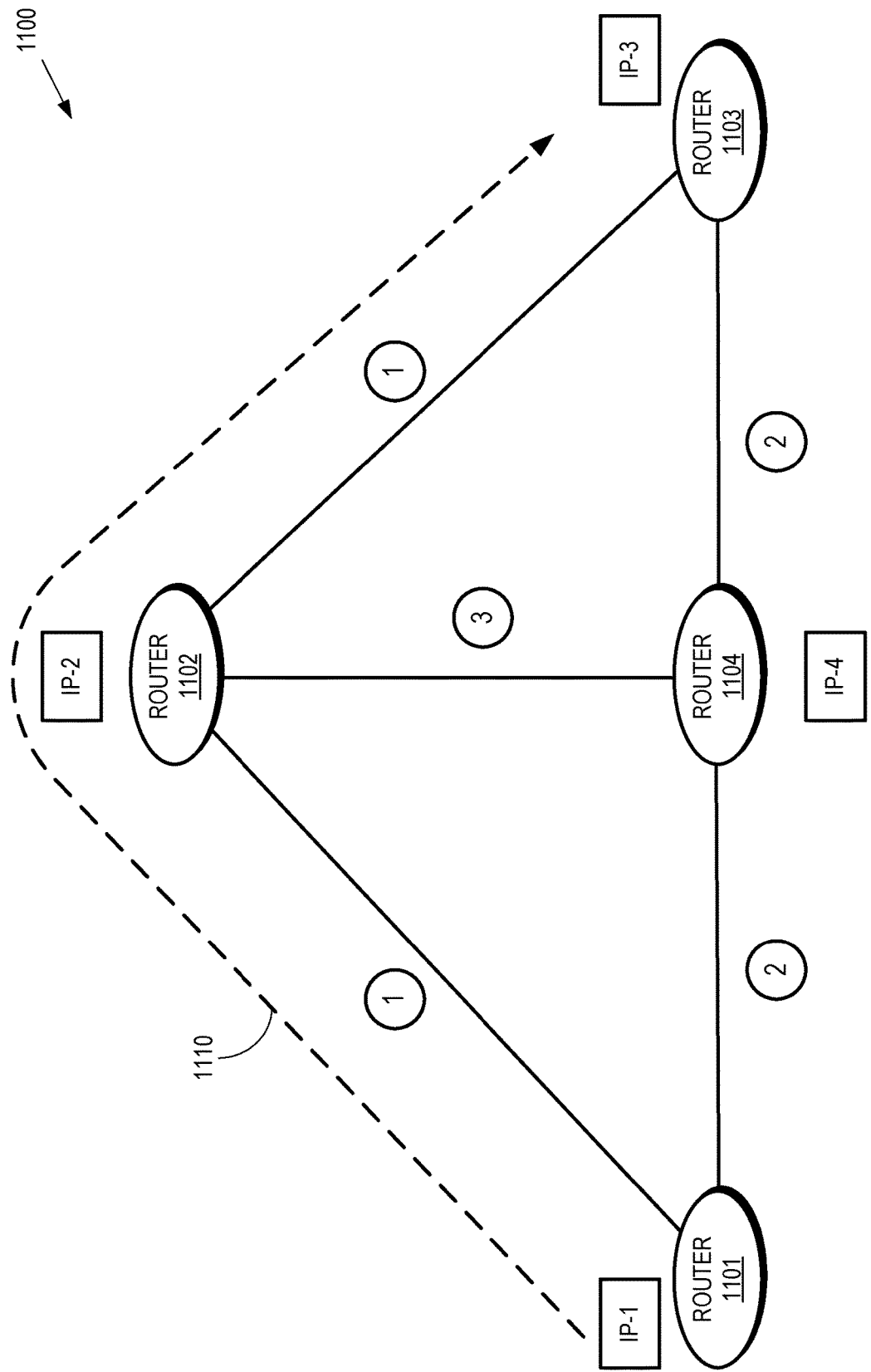
FIG. 11 is a block diagram of a communication system that uses Internet protocol (IPv4) addresses as unique identifiers of routers according to some embodiments.

FIG. 11 is a block diagram of a communication system 1100 that uses IPv4 addresses as unique identifiers of routers according to some embodiments. The communication system 1100 includes routers 1101, 1102, 1103, 1104, which are collectively referred to herein as "the routers 1101-1104." In the illustrated embodiment, the router 1101 is a source router that is connected to a source (such as the source 105 shown in FIG. 1 and the source 205 shown in FIG. 2) and the router 1103 is a destination router that is connected to a destination (such as the destination 110 shown in FIG. 1 and the destination 210 shown in FIG. 2). The metrics or costs of the links are indicated in the circled numerals. For example, the cost of the link between the router 1101 and the router 1102 is one and the cost of the link between the router 1102 and the router 1104 is three.

The routers 1101-1104 uses an SPF algorithm to compute a shortest path 1110 from the source router 1101 to the destination routers 1103 based on the metrics or costs of the links. In the illustrated embodiment, the shortest path 1110 includes the routers 1101-1103. The shortest path is an LSP and so the routers 1101-1104 advertise labels associated with the path.

Each of the routers 1101-1104 is configured with an identifier that uniquely identifies the corresponding router 1101-1104 within the communication system 1100. In the illustrated embodiment, the unique identifiers are IPv4 loopback addresses that are allocated to the routers 1101-1104. For example, the router 1101 is assigned its IP address IP-1 as the unique identifier, the router 1102 is assigned a unique identifier IP-2, the router 1103 is assigned the unique identifier IP-3, and the router 1104 is assigned the unique identifier IP-4. Thus, the routers 1101-1104 automatically derive the network-wide unique identifier from the IPv4 loopback address without requiring a central controller to manage a global label space. The IPv4 loopback address is encoded as the router label in the RRLS using the 32 bits in a standard MPLS label. As discussed herein, the routers 1101-1104 push their unique identifiers onto a stack of router labels that is referred to herein as a recorded route label stack (RRLS) so that the RRLS in a packet indicates the set of routers that have processed the packet as the packet traversed the path to the current router.

Figure 12:
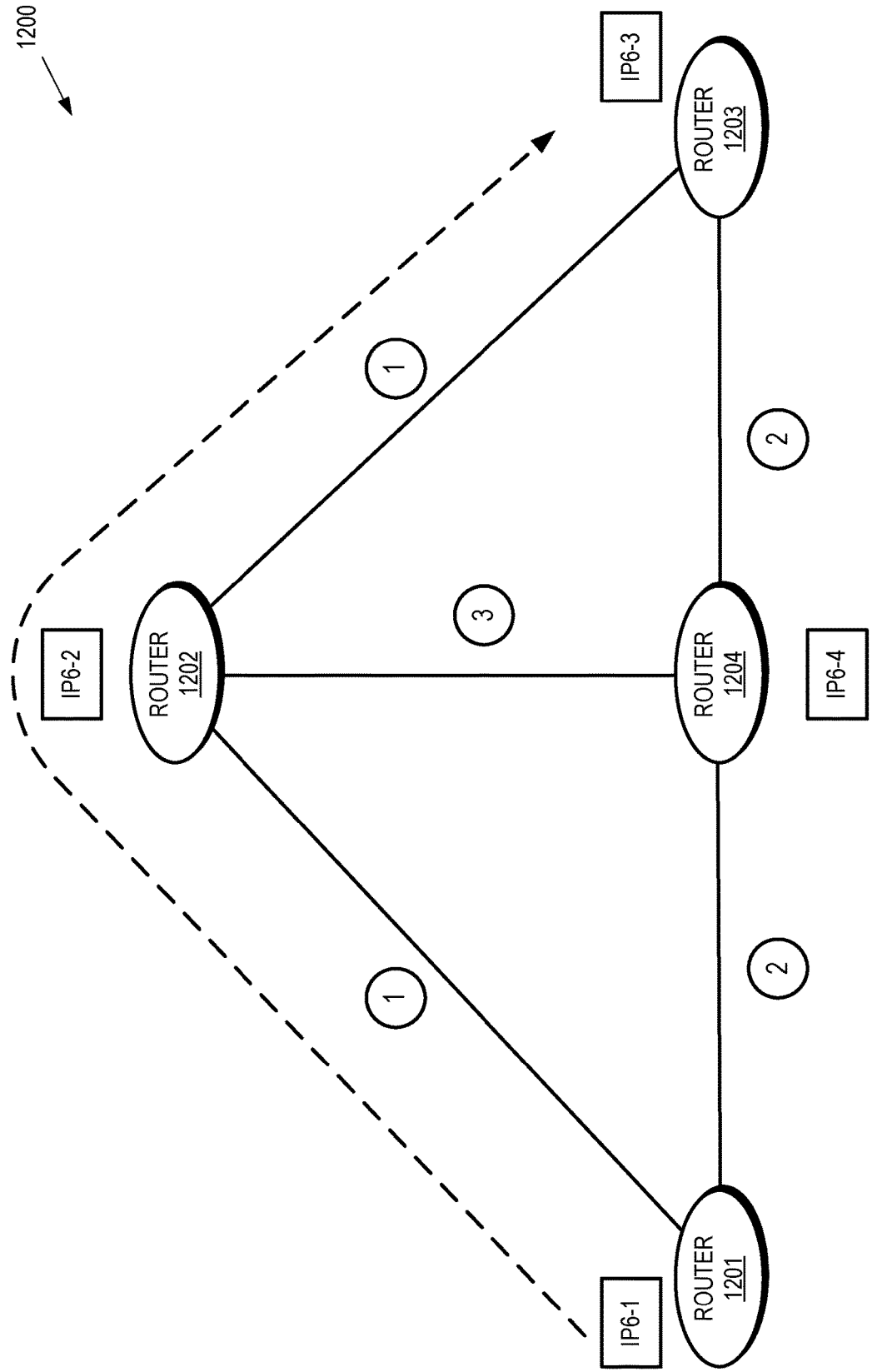
FIG. 12 is a block diagram of a communication system that uses IPv6 addresses as unique identifiers of routers according to some embodiments.

FIG. 12 is a block diagram of a communication system 1200 that uses IPv6 addresses as unique identifiers of routers according to some embodiments. The communication system 1200 includes routers 1201, 1202, 1203, 1204, which are collectively referred to herein as "the routers 1201-1204." In the illustrated embodiment, the router 1201 is a source router that is connected to a source (such as the source 105 shown in FIG. 1 and the source 205 shown in FIG. 2) and the router 1203 is a destination router that is connected to a destination (such as the destination 110 shown in FIG. 1 and the destination 210 shown in FIG. 2). The metrics or costs of the links are indicated in the circled numerals. The routers 1201-1204 uses an SPF algorithm to compute a shortest path 1210 from the source router 1201 to the destination routers 1203 based on the metrics or costs of the links. In the illustrated embodiment, the shortest path 1210 includes the routers 1201-1203. The shortest path is an LSP and so the routers 1201-1204 advertise labels associated with the path.

Each of the routers 1201-1204 is configured with an identifier that uniquely identifies the corresponding router 1201-1204 within the communication system 1200. In the illustrated embodiment, the unique identifiers are derived from IPv6 loopback addresses that are allocated to the routers 1201-1204. For example, the unique identifier of the router 1201 is derived from IP6-1, the unique identifier of the router 1102 is derived from IP6-2, the unique identifier of the router 1203 is derived from IP6-3, and the unique identifier of the router 1204 is derived from IP6-4. Thus, the routers 1201-1204 automatically derive the network-wide unique identifier from the IPv6 loopback address without requiring a central controller to manage a global label space.

A standard MPLS label is encoded in 32 bits, but an IPv6 address is included in 128 bits. Thus, using the IPv6 address as the unique identifier of the routers 1201-1204 requires using four standard MPLS labels, which imposes a higher overhead on the RRLS used for loop detection. In some embodiments, the routers 1201-1204 derive their unique identifiers from a 4-octet word within their IPv6 loopback addresses such that the 4-octet word of an IPv6 address is unique across the network. Then routers 1201-1204 encode only the 4-octet word as an IPv4 encoded router label in the RRLS. As discussed herein, the routers 1201-1204 push their unique identifiers onto a stack of router labels that is referred to herein as a recorded route label stack (RRLS) so that the RRLS in a packet indicates the set of routers that have process the packet as the packet traversed the path to the current router.

FIG. 13 is an example of a recorded route label stack (RRLS) 1300 according to some embodiments. The RRLS 1300 is positioned atop the label of the LSP in the illustrated embodiment. However, other embodiments position the RRLS below the label of the LSP. If the RRLS 1300 is embedded within an MPLS label stack that includes other labels, receiving routers distinguish unambiguously between the RRLS 1300 and the non-RRLS labels using an RRLS-indicator (RRLS-I), where preceding means closer to the top of the label stack and further from the bottom of the stack indication. The RRLS-I is a special label that is not used for other purposes. The EXP and TTL field in the RRLS-I are set to 0 and receiving routers ignore these fields. The sending router and the receiving router of the RRLS use the EXP field of the label underneath the RRLS for mapping the packet to the appropriate forwarding class. The S-bit in RRLS-I is set to 0 because labels of the RRLS follow.

FIG. 14 is an example of an RRLS descriptor 1400 according to some embodiments. The RRLS descriptor 1400 follows the RRLS-I and describes the method used to encode the router labels and the number of subsequent labels in the RRLS. The RRLS descriptor 1400 therefore does not have a special fixed value. Instead, the value of the RRLS descriptor 1400 includes the type of encoding of router labels and the number of subsequent labels in the RRLS.

The RRLS descriptor 1400 encodes the following:

Type: This 3-bit field encodes the type of encoding used in router labels. Following types are defined by this invention.

0x1=Means MPLS label wherein 20-bit label value encodes the label that identifies a router (e.g using global label space).

0x2=Means IPv4 encoded MPLS Label, wherein then entire 32-bit of the MPLS label encodes an IPv4 address of a router.

0x3=Means IPv6 encoded MPLS labels, wherein a set of 4 consecutive labels encode an IPv6 address of a router.

Num Labels=17-bit field, value of which indicates the number of subsequent labels that belong to the RRLS. If the value is 'N' then subsequent N labels (following the RRLS descriptor) belong to the RRLS.

Exp=Originator of the RRLS packet must set this field to 0. Receiver should ignore the value of this field.

S=Must be set to 0, as the labels describing the router labels follow.

TTL=Must be set to 0. Receiver should ignore the value of this field.

A router label stack is the body of an RRLS and the structure of the router label stack depends on the Type field in the RRLS descriptor.

FIG. 15 is an example of a router label stack 1500 for Type 0x1 according to some embodiments. In the illustrated embodiment, the router labels of the traversed hops are encoded in the reverse order, since a router along the path of the packet always pushes its router label as the topmost label in the stack. So, Router Label 1 identifies the latest router in the path and Router Label N identifies the first router in the path that enabled loop detection in the packet. The EXP and TTL field in an MPLS label is set to 0 by the originator and should be ignored by a receiver. The S-bit in an MPLS label is set to 0 by the originator, except the last label. The S-bit in the last label is dependent on whether other labels follow the RRLS. The label stack of the LSP on which loop detection is enabled follows the RRLS and in some cases, the S-bit in the last label in RRLS is set to 0. However, in other cases, the S-bit has different values. For example, when the last hop on an LSP uses implicit null label (i.e label value 3) no label is inserted by the last hop. If no other labels follow below the LSP's label stack then last label in the RRLS is the last label in the MPLS packet. In that case, S-bit in the last label in RRLS would be set to 1.

FIG. 16 is an example of a router label stack 1600 for Type 0x2 according to some embodiments. For Type 0x2, each MPLS Label encodes a distinct router label. The entire 32-bit of the MPLS label encodes an IPv4 address that identifies the router. The router labels of the traversed hops are encoded in the reverse order, since a router along the path of the packet always pushes its router label as the topmost label in the stack. So, Router Label 1 identifies the latest router in the path and Router Label N identifies the first router in the path that enabled loop detection in the packet.

FIG. 17 is an example of a router label stack 1700 for Type 0x3 according to some embodiments. For Type 0x3, a set of four consecutive MPLS Labels encode a distinct router label and the set encodes a 128-bitb IPv6 address that identifies a router. The entire 32-bit of a MPLS label in the set encodes corresponding 32-bits of the encoded IPv6 address. The router labels of the traversed hops are encoded in the reverse order, since a router along the path of the packet always pushes its router label as the topmost label in the stack. So, Router Label 1 identifies the latest router in the path and Router Label N identifies the first router in the path that enabled loop detection in the packet.

Figure 18:
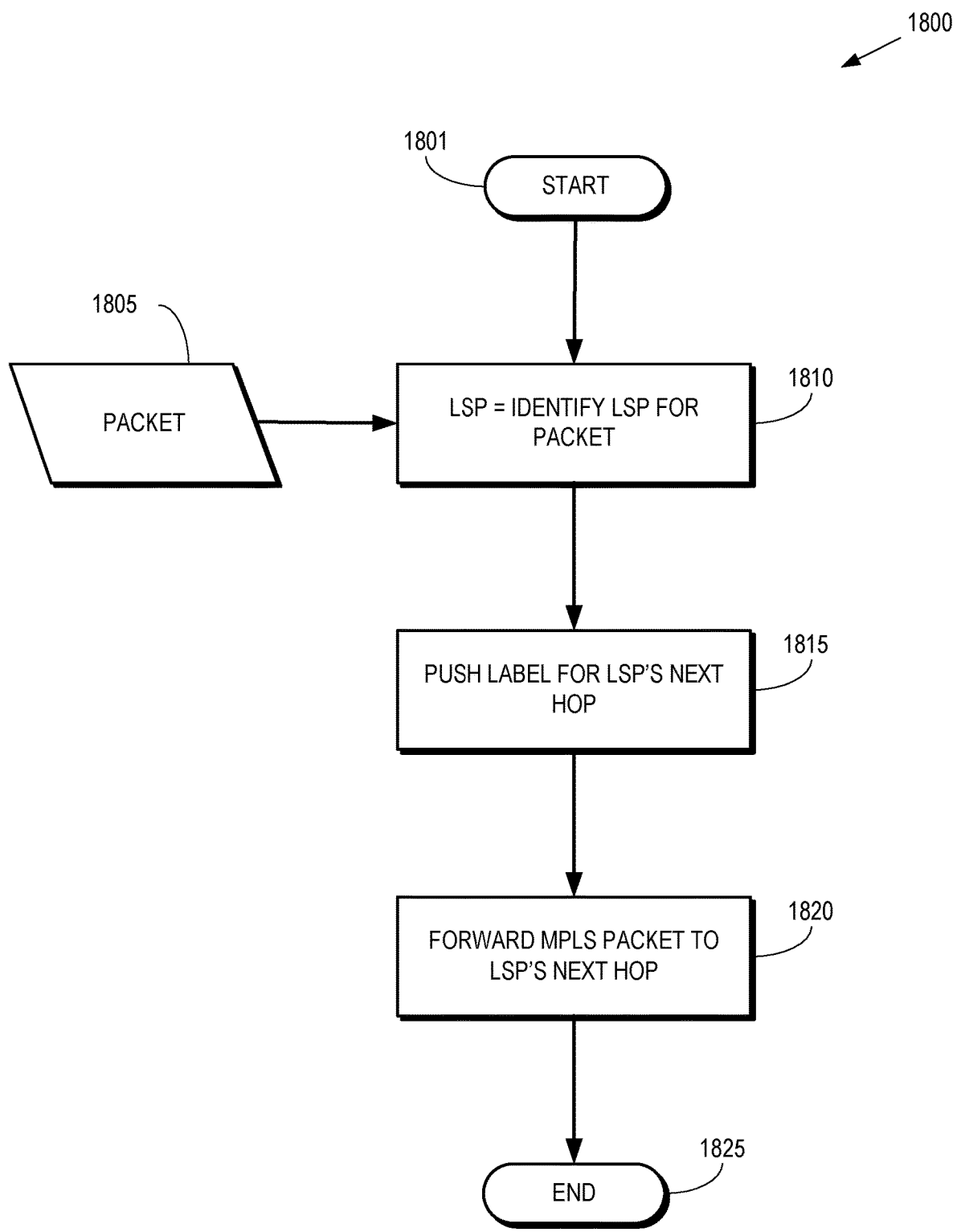
FIG. 18 is a flow diagram of a method of originating a packet at an ingress router according to some embodiments.

FIG. 18 is a flow diagram of a method 1800 of originating a packet at an ingress router according to some embodiments. The method 1800 is implemented by routers in some embodiments of the communication system 100 shown in FIG. 1, the communication system 600 shown in FIG. 6, the communication system 700 shown in FIG. 7, and the communication system 800 shown in FIG. 8.

The method 1800 begins at block 1801. At the input block 1805, the router receives a packet that is to be transmitted along an LSP. At block 1810, the router determines the LSP that is used to transmit the packet, e.g., based on an LSP label included in the packet, as discussed herein. At block 1815, the router determines the next hop for the packet on the LSP and then pushes the appropriate label for the next hop onto the packet. If required, the router also pushes the RRLS onto the packet. At block 1820, the router forwards the packet to the next hop of the LSP. At block 1825, the method 1800 ends.

Figure 19:
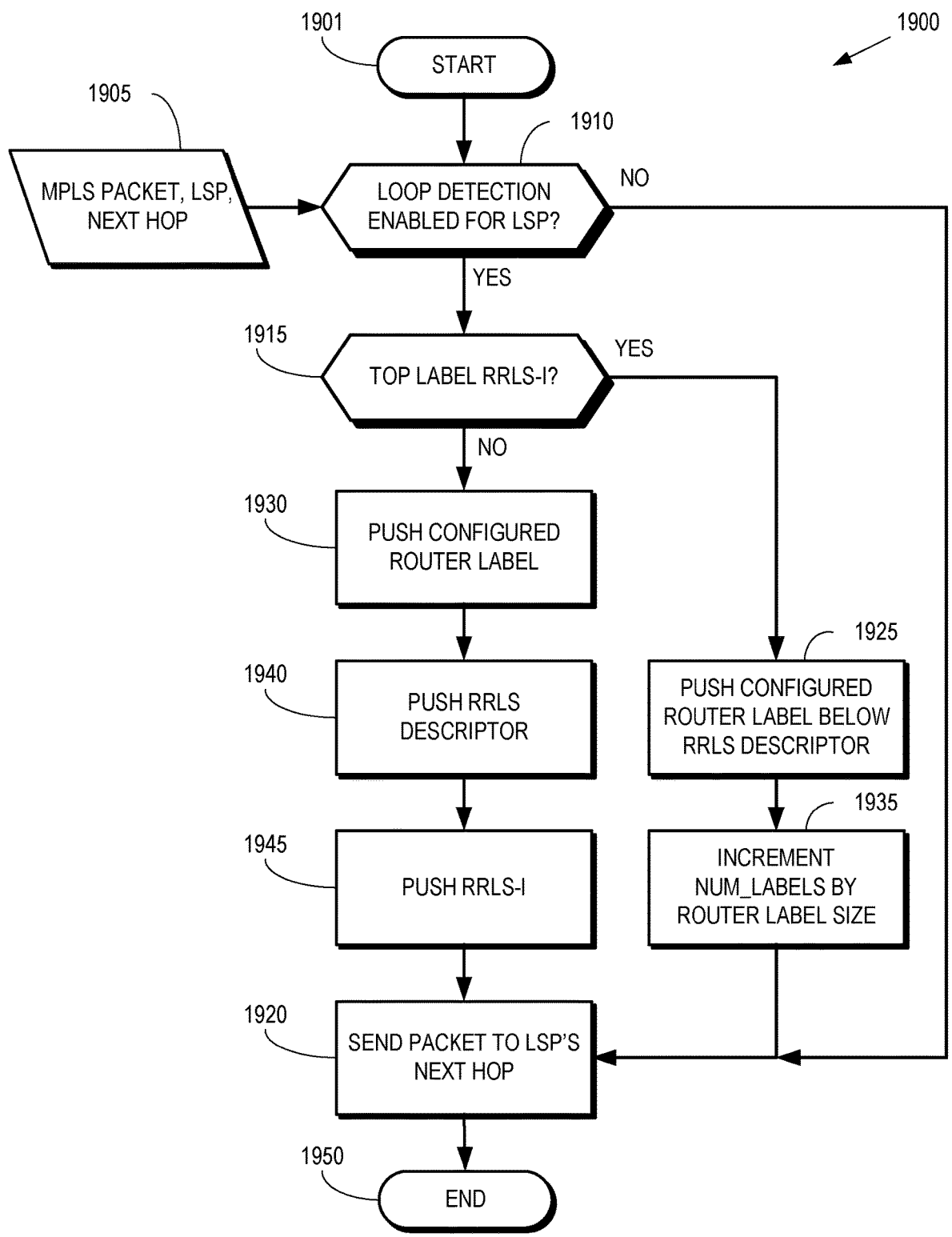
FIG. 19 is a flow diagram of a method of forwarding a packet from a router to a next hop of an LSP according to some embodiments.

FIG. 19 is a flow diagram of a method 1900 of forwarding a packet from a router to a next hop of an LSP according to some embodiments. The method 1900 is implemented by routers in some embodiments of the communication system 100 shown in FIG. 1, the communication system 600 shown in FIG. 6, the communication system 700 shown in FIG. 7, and the communication system 800 shown in FIG. 8.

The method 1900 begins at block 1901. At the input block 1905, the router receives a packet that includes a top label as the label to the next hop of the LSP, configuration of the LSP itself, and the next hop of the LSP on which to forward the packet.

At decision block 1910, the router determines whether loop detection is enabled on the LSP. Some embodiments of the router determine whether loop detection is enabled based on criteria including whether loop detection is required by default, whether loop detection is required during fast rerouting and whether the next hop is a backup or alternate next hop, whether loop detection is required for test packets such as operation, administration, and maintenance (OAM) packets and whether the received packet is an OAM packet. If loop detection is enabled, the method 1900 flows to decision block 1915. If loop detection is not enabled, the method 1900 flows to block 1920.

At decision block 1915, the router determines whether the top label is an RRLS-I. If so, which indicates that an RRLS is already included in the top of the packet, the method 1900 flows to block 1925. If not, the method flows to block 1930.

At block 1925, the router pushes its unique router label configured in the router below the RRLS descriptor. At block 1935, the router increments the NumLabels field in the descriptor by the size of the router label. For router label types 0x1 and 0x2, the size of the router label is one and for the type 0x3, the size of the router label is four. The method 1900 then flows to block 1920.

At block 1930, the router pushes its unique router label onto the packet. At block 1940, the router pushes the RRLS Descriptor onto the packet. The type field in the RRLS descriptor is set according to the encoding type of the router label, as discussed herein. The NumLabels field in the RRLS descriptor is set according to the size of the router label, which depends on the type, as discussed herein. At block 1945, the router pushes the RRLS-I onto the packet. The method 1900 then flows to block 1920.

At block 1920, the router sends the packet to the next top of the LSP. If the LSP needs to override on another LSP, e.g., in an MPLS hierarchy as discussed herein, the method 1900 is re-executed on the same packet for the next level of the hierarchy. The method 1900 then flows to block 1950 and the method 1900 ends.

Figure 20:
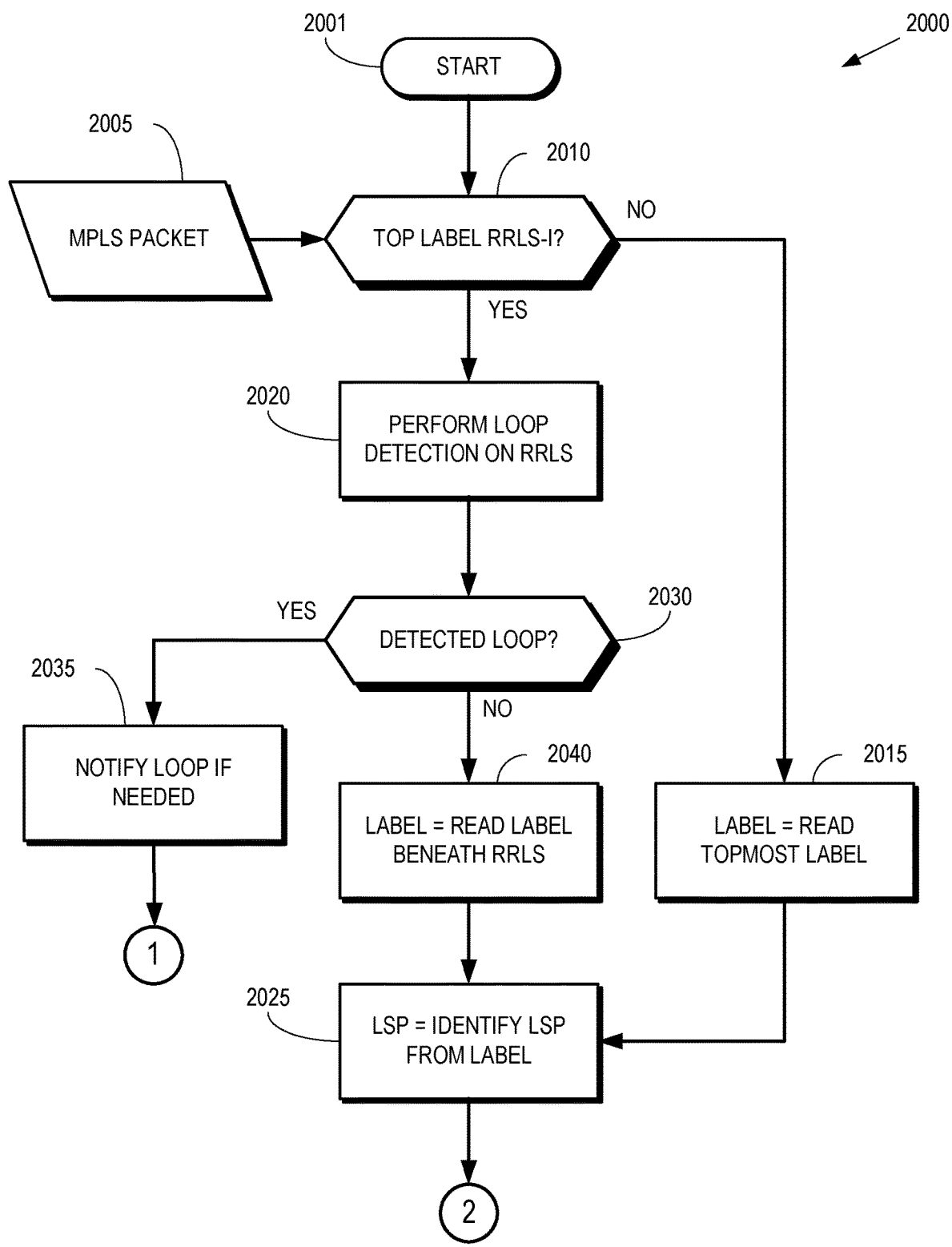
FIG. 20 is a flow diagram of a first portion of a method of processing a packet at a transit or egress router of an LSP according to some embodiments.

FIG. 20 is a flow diagram of a first portion of a method 2000 of processing a packet at a transit or egress router of an LSP according to some embodiments. The method 2000 is implemented by routers in some embodiments of the communication system 100 shown in FIG. 1, the communication system 600 shown in FIG. 6, the communication system 700 shown in FIG. 7, and the communication system 800 shown in FIG. 8.

The method 2000 begins at block 2001. At the input block 2005, the router receives a packet such as an MPLS packet.

At decision block 2010, the router determines whether there is an RRLS at the top of the packet. The router performs the check by determining whether the top label on the packet is an RRLS-I. If not, the method 2000 flows to block 2015. If the router detects an RRLS at the top of the packet, the method 2000 flows to block 2020.

At block 2015, the router reads the topmost label from the packet, which in this case is the incoming label of the LSP that is to be processed by the router. The method 2000 then flows to block 2025.

At block 2020, the router performs loop detection on the RRLS, as discussed herein. At decision block 2030, the router determines whether a loop is detected. If so, the method 2000 flows to the block 2035 and the router (optionally) transmits a loop detection notification, as discussed herein. If the router is to transmit a loop detection notification, the router generates the loop detection notification at block 2035. The method 2000 then flows to the node 1. If no loop is detected, the method 2000 flows to the block 2040.

At block 2040, the router reads the label beneath the RRLS, which is the incoming label of the LSP that is to be processed by this router. The method 2000 then flows to block 2025.

At block 2025, the router looks up the forwarding state of the LSP using the incoming label of the LSP. The method 2000 then flows to the node 2.

Figure 21:
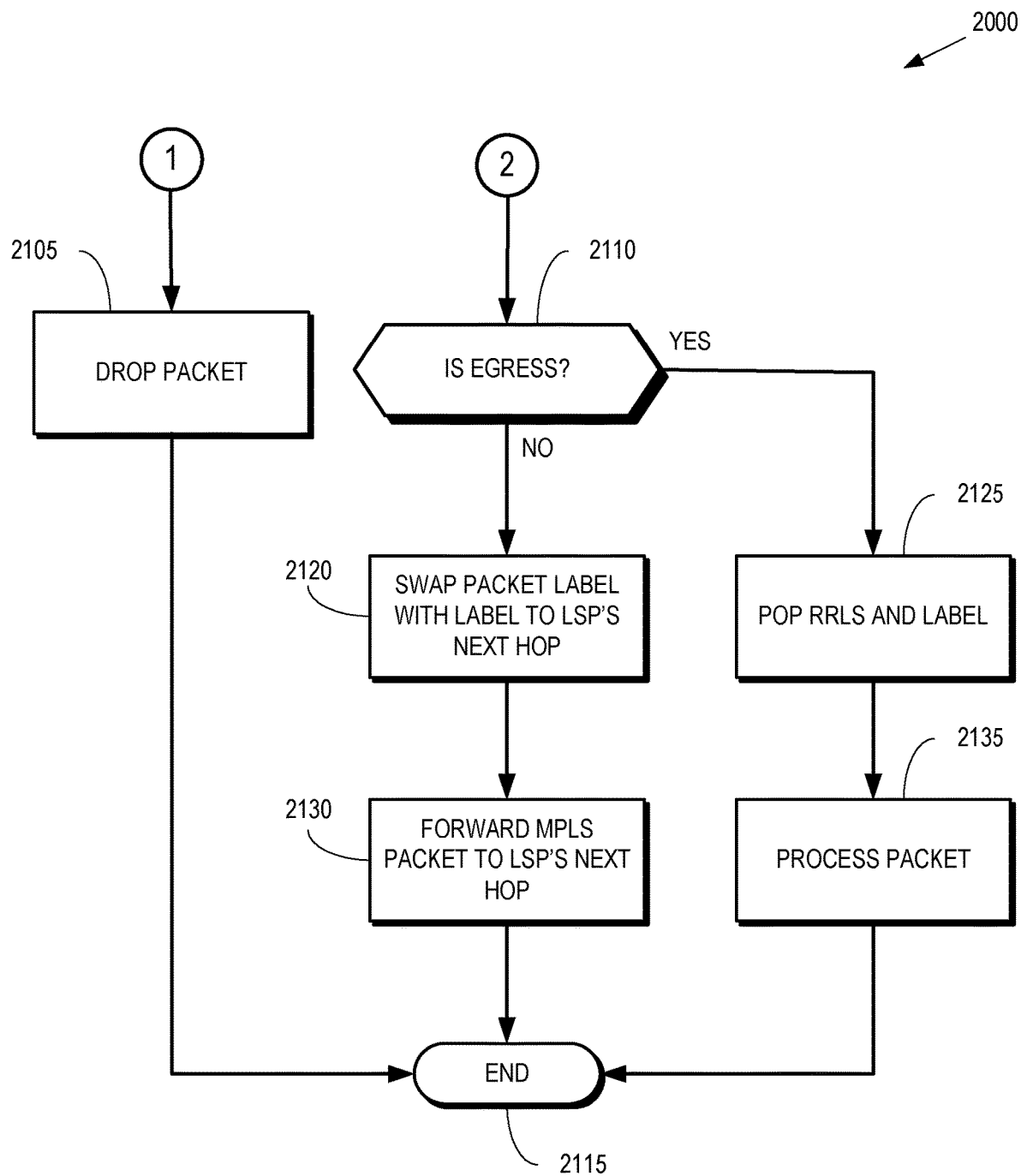
FIG. 21 is a flow diagram of a second portion of the method of processing a packet at a transit or egress router of an LSP according to some embodiments.

FIG. 21 is a flow diagram of a second portion of the method 2000 of processing a packet at a transit or egress router of an LSP according to some embodiments. The node 1 connects the block 2035 shown in FIG. 20 to the block 2105 in FIG. 21. The node 2 connects the block 2025 shown in FIG. 20 to the decision block 2110 in FIG. 21.

At block 2105, the router drops the packet. The method 2000 then flows to block 2115 and the method 2000 ends.

At decision block 2110, the router determines whether the forwarding state indicates that the router is the egress router for the LSP. If the router is not the egress router, the method 2000 flows to the block 2120. If the router is the egress router, the method 2000 flows to the block 2125.

At block 2120, the router swaps the incoming label of the LSP with the label advertised by the next top of the LSP. At block 2130, the router forwards the packet to the next top of the LSP. The method 2000 then flows to the block 2115 and the method 2000 ends.

At block 2125, the router pops the RRLS (if present) and the incoming label of the LSP. At block 2135, the router processes the packet based on the underlying headers. If the top of the packet includes another MPLS label, then the router re-executes the method 2000 by sending the packet as an input. If no more labels are in the packet, then the router processes the packet based on the native header in the packet. The method 2000 then flows to the block 2115 and the method 2000 ends.

Figure 22:
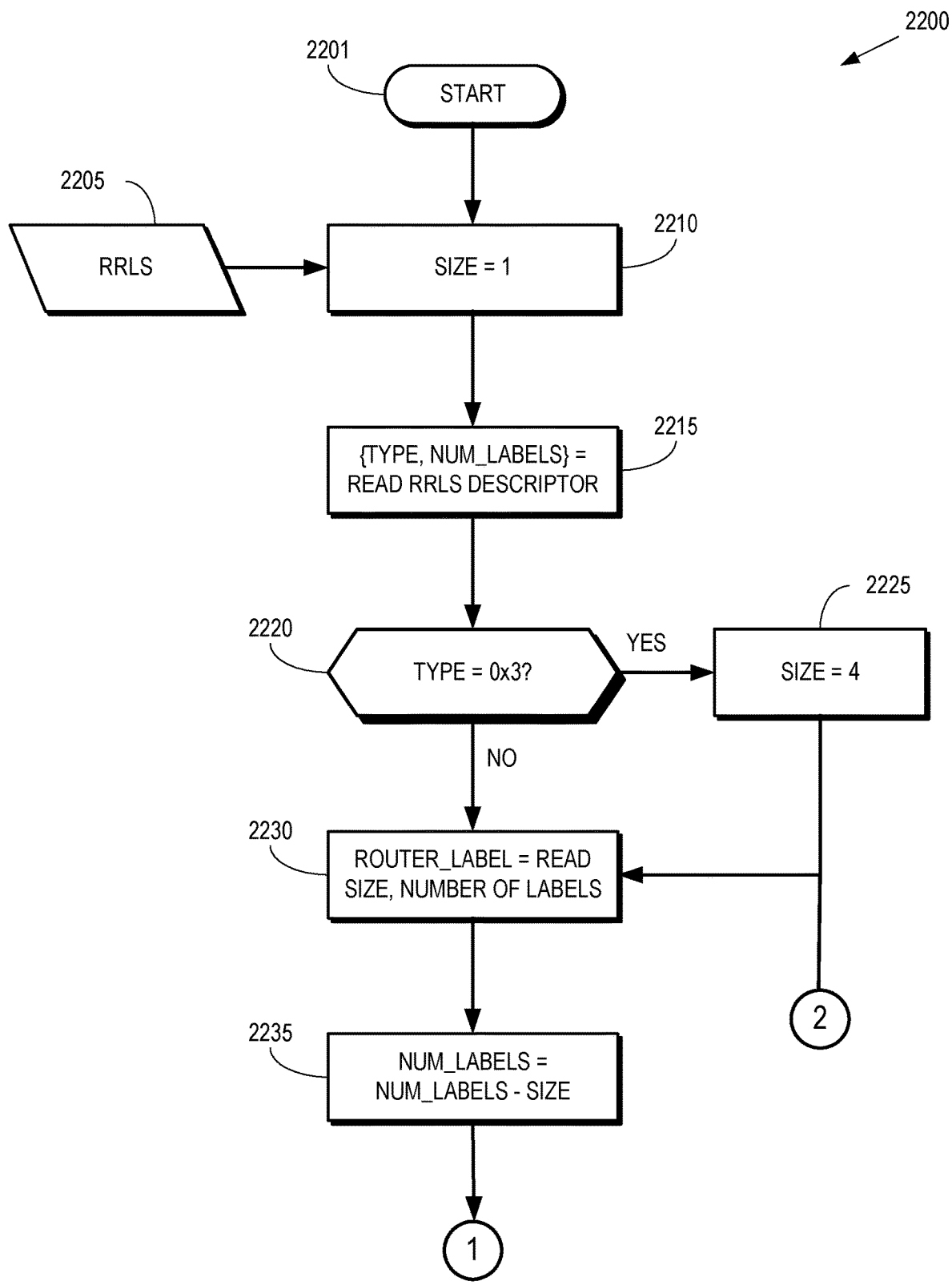
FIG. 22 is a flow diagram of a first portion of a method of performing loop detection according to some embodiments.

FIG. 22 is a flow diagram of a first portion of a method 2200 of performing loop detection according to some embodiments. The method 2200 is implemented by routers in some embodiments of the communication system 100 shown in FIG. 1, the communication system 600 shown in FIG. 6, the communication system 700 shown in FIG. 7, the communication system 800 shown in FIG. 8, and by the block 2020 in FIG. 20.

The method 2200 begins at block 2201. At the input block 2205, the router receives an RRLS from a packet (such as an MPLS packet) that is received by the router. At block 2210, the router initializes a local variable "Size" to a predetermined value such as one. This variable is used to track the number of labels that include a router label in the RRLS. At block 2215, the router reads the Type and NumLabels fields in the RRLS descriptor and stores the values in local variables of the same name.

At decision block 2220, the router determines whether the Type is 0x3. If so, the method 2000 flows to the block 2225. If the Type is not 0x3, the method 2200 flows to the block 2230.

At block 2225, the router sets the value of the Size variable to a number of labels that are used to encode the router label such as a value of four to indicate that four MPLS labels include the router label. For example, four MPLS labels are used to encode an IPv6 address as the unique label of the router. The method 2200 then flows to the block 2230.

At the block 2230, the router reads the router label (of Size number of labels) at label index NumLabels from the router label stack of the RRLS in the packet. At the block 2235, the router decrements the value of NumLabels by the value of Size so that the NumLabels index points to the label index for the next router. The method 2200 then flows to the node 1.

Figure 23:
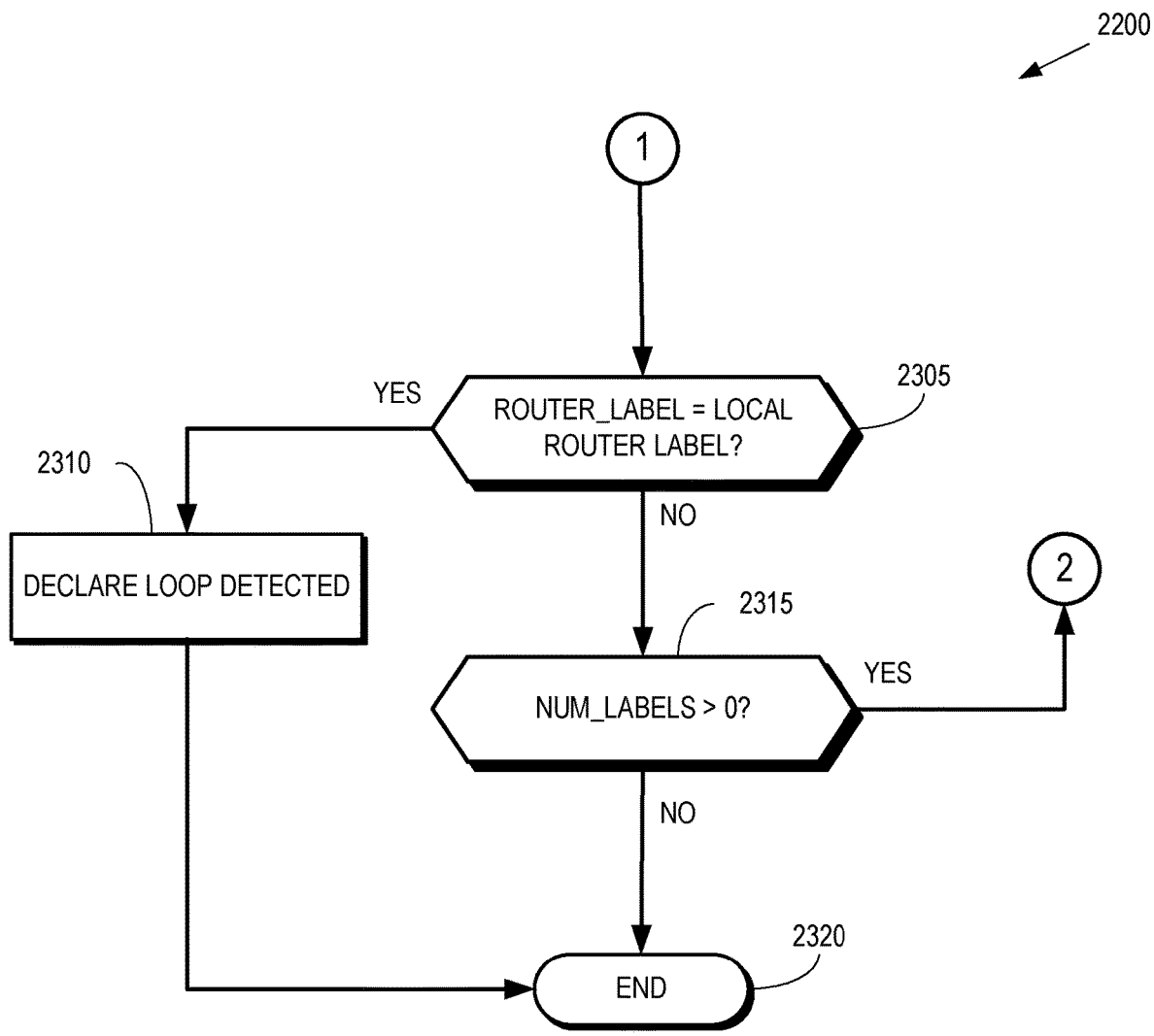
FIG. 23 is a flow diagram of a second portion of the method of performing loop detection according to some embodiments.

FIG. 23 is a flow diagram of a second portion of the method 2200 of performing loop detection according to some embodiments. The node 1 connects the block 2235 shown in FIG. 22 to the decision block 2305 in FIG. 23.

At decision block 2305, the router determines whether the router label is the same as the locally configured router label, e.g., the router label stored in or derived by the router. If the router label is the same as the locally configured router label, the method 2200 flows to the block 2310 and the router declares detection of a loop. The method 2200 then flows to block 2320 and the method 2200 ends. If the router label is not the same as the locally configured router label, the method 2200 flows to the decision block 2315.

At decision block 2315, the router determines whether there are additional router labels to be in the router label stack. The router performs the check by checking whether the value of NumLabels is greater than zero. If the value is greater than zero, which indicates that there are more router labels, the method 2200 flows to node 2 so that the method 2200 returns to block 2230 in FIG. 22. If the value of NumLabels is not greater than zero, which indicates that there are no more router labels in the router label stack, the method 2200 flows to block 2320 and the method 2200 ends.

Figure 24:
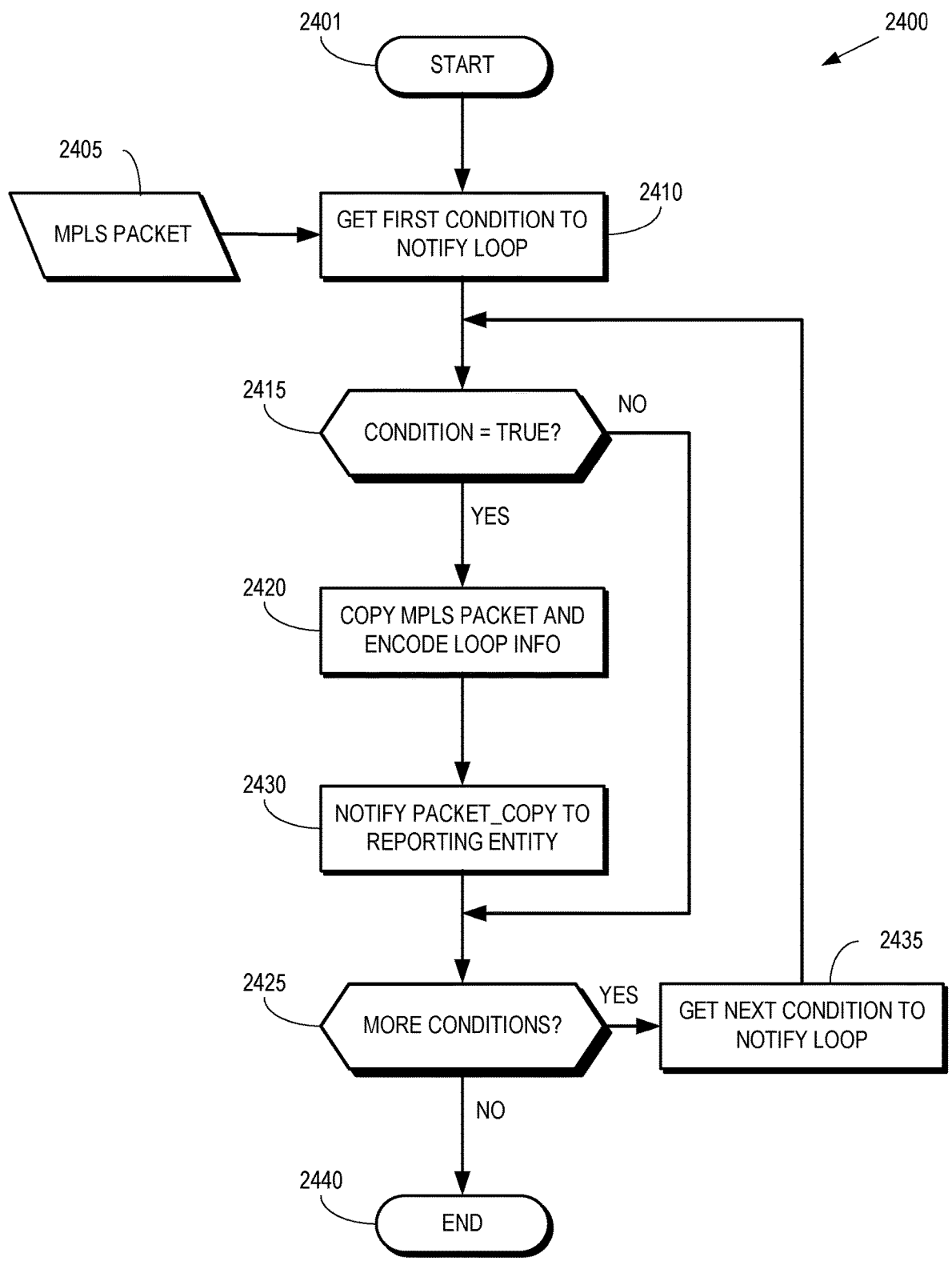
FIG. 24 is a flow diagram of a method of notifying detection of a loop according to some embodiments.

FIG. 24 is a flow diagram of a method 2400 of notifying detection of a loop according to some embodiments. The method 2400 is implemented by routers in some embodiments of the communication system 100 shown in FIG. 1, the communication system 600 shown in FIG. 6, the communication system 700 shown in FIG. 7, the communication system 800 shown in FIG. 8, and by the block 2035 in FIG. 23.

The method 2400 begins at block 2401. At the input block 2405, the router receives a packet such as an MPLS packet on which the loop is detected. At block 2410, the router retrieves the first condition for notification of the loop. At decision block 2415, the router determines whether the condition has been met by the input packet. If the packet meets the condition, the method 2400 flows to block 2420. Otherwise, the method of 2400 flows to decision block 2425.

At block 2420, the router makes a copy of the packet and includes the loop information into the packet. At block 2430, the router transmits the copy of the packet to a reporting entity associated with the loop detection condition. The method 2400 then flows to decision block 2425.

At decision block 2425, the router determines whether there are other conditions for notification of the loop. If so, the method 2400 flows to block 2435 and the router retrieves the next condition for notification of the loop. The method 2400 then flows to decision block 2415. If there are no other conditions for notification of the loop, the method 2400 flows to the block 2440 and the method 2400 ends.

Figure 25:
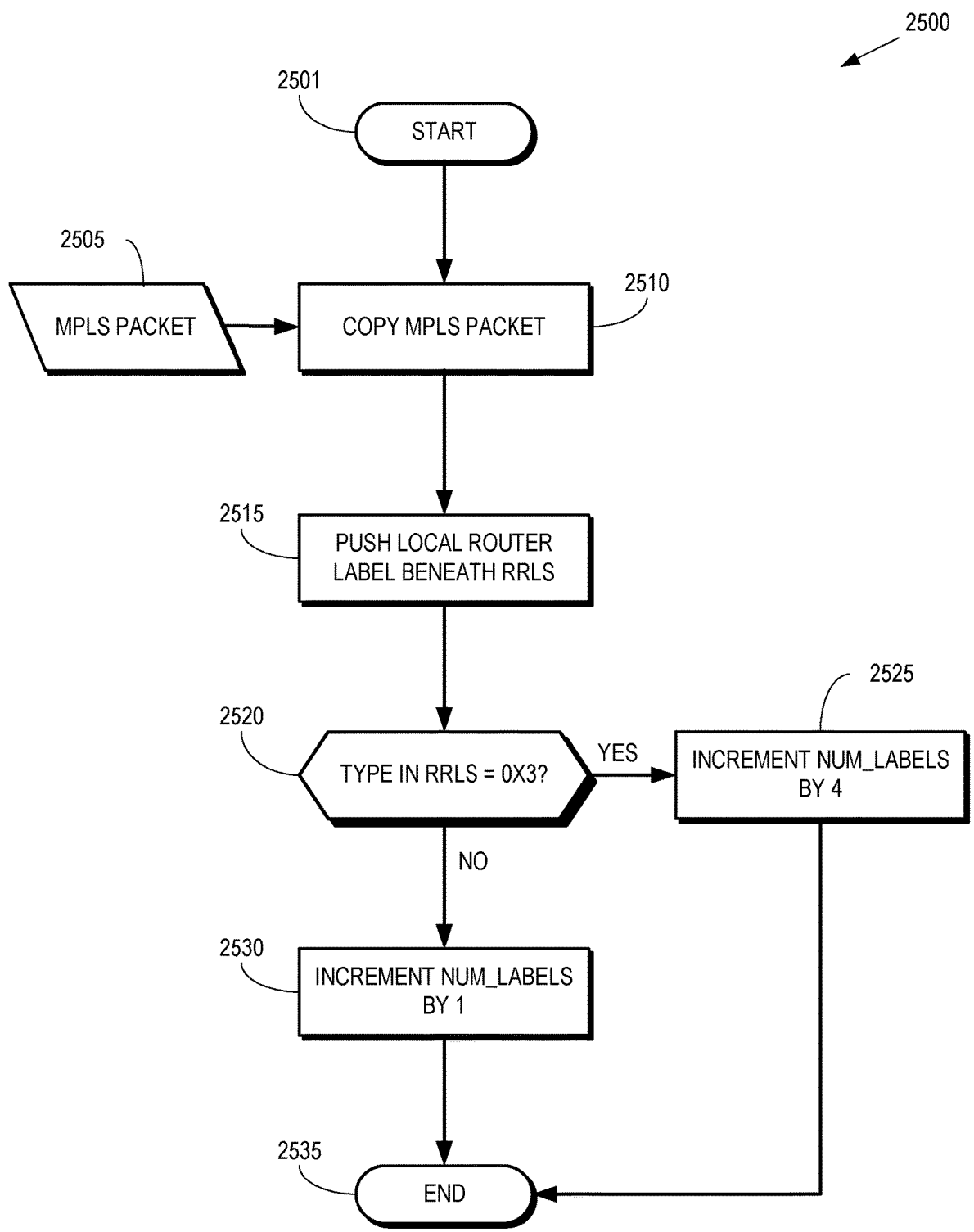
FIG. 25 is a flow diagram of a method of copying a packet to send with a loop detection notification according to some embodiments.

FIG. 25 is a flow diagram of a method 2500 of copying a packet to send with a loop detection notification according to some embodiments. The method 2500 is used to implement some embodiments of the block 2420 shown in FIG. 24.

The method 2500 begins at block 2501. At the input block 2505, the router receives a packet such as an MPLS packet on which the loop is detected. At block 2510, the router makes a copy of the packet. At block 2515, the router pushes the locally configured router label beneath the RRLS Descriptor in the copy of the packet.

At decision block 2520, the router determines whether the Type in the RRLS Descriptor in the packet copy is 0x3. If the Type is not 0x3, the method 2500 flows to block 2525. If the Type is 0x3, the method 2500 flows to block 2530.

At block 2525, the router increments the NumLabels field in the RRLS descriptor in the packet copy by one (or other predetermined value) because the local router label of size one has been inserted in the copy of the packet. The method 2500 then flows to block 2535 and the method 2500 ends.

At block 2530, the router increments the NumLabels field in the RRLS descriptor in the packet copy by four (or other predetermined value) because the local router label of size four has been inserted in the copy of the packet. The method 2500 then flows to block 2535 and the method 2500 ends.

Figure 26:
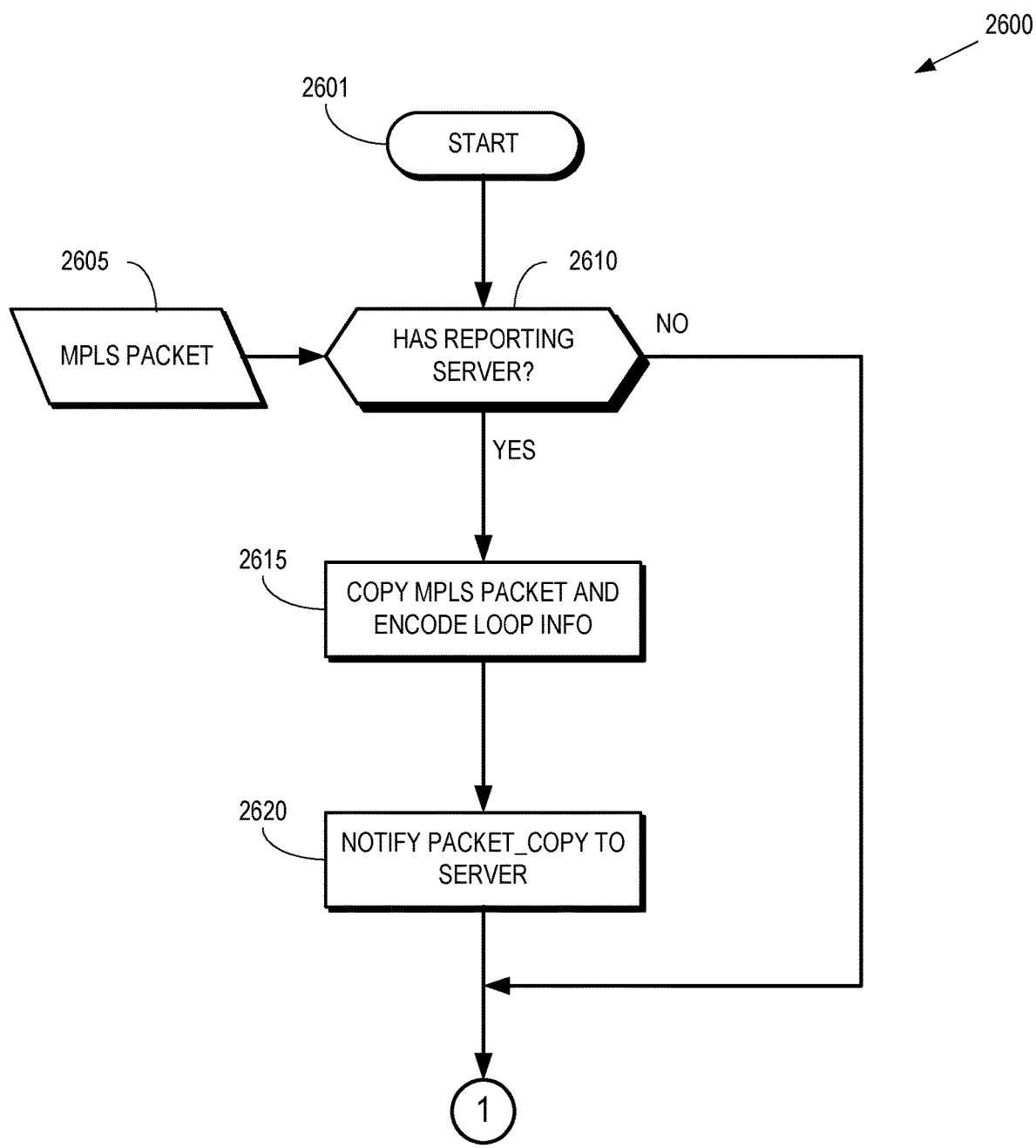
FIG. 26 is a flow diagram of a first portion of a method of notifying detection of a loop to a server or a sender of an operations, administration, and maintenance (OAM) packet according to some embodiments.

FIG. 26 is a flow diagram of a first portion of a method 2600 of notifying detection of a loop to a server or a sender of an OAM packet according to some embodiments. The method 2600 is implemented by routers in some embodiments of the communication system 100 shown in FIG. 1, the communication system 600 shown in FIG. 6, the communication system 700 shown in FIG. 7, and the communication system 800 shown in FIG. 8. The method 2600 implements two conditions for notification of a loop: (1) if a notification server is configured to notify the loop detected in the network to the server and (2) if the packet is a test/OAM packet (e.g., an LSP ping packet) then notify the loop to the sender of the OAM packet. Some embodiments of the method 2600 are implemented based on the framework of method 2400 in FIG. 24.

The method 2600 begins at block 2601. At the input block 2605, the router receives a packet such as an MPLS packet on which the loop is detected. At decision block 2610, the router determines whether the router is configured to notify loops to a reporting server. If so, the method 2600 flows to block 2615. If the router is not configured to notify loops to a reporting server, the method 2600 flows to node 1.

At block 2615, the router makes a copy of the packet and encodes the loop information into the packet. At block 2620, the router sends the packet copy to the reporting server. The packet copy includes information indicating that the loop has been detected. The method 2600 then flows to node 1.

Figure 27:
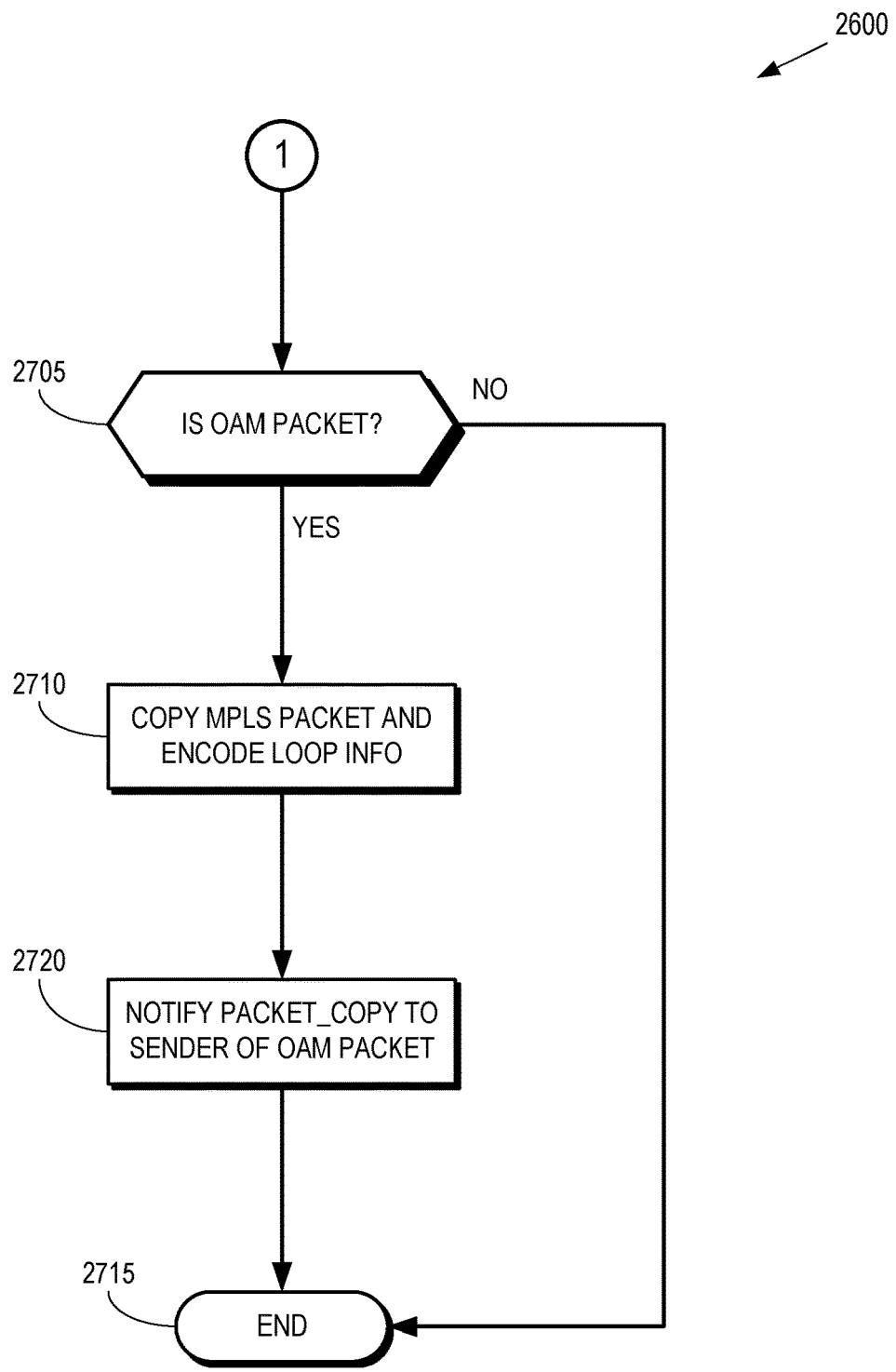
FIG. 27 is a flow diagram of a second portion of the method of notifying detection of a loop to a server or a sender of an OAM packet according to some embodiments.

FIG. 27 is a flow diagram of a second portion of the method 2600 of notifying detection of a loop to a server or a sender of an OAM packet according to some embodiments. The node 1 connects the block 2620 in FIG. 26 to the decision block 2705 in FIG. 27.

At decision block 2705, the router determines whether the input packet is a test packet or an OAM packet. For example, an OAM packet could be an LSP Ping packet. If the input packet is an OAM packet, the method 2600 flows to block 2710. Otherwise, the method 2600 flows to block 2715 and the method 2600 ends.

At block 2710, the router makes a copy of the packet and encodes the loop information into the packet. At block 2720, the router transmits a reply to the sender of the OAM packet. In some embodiments, the reply includes the label stack from the copy of the MPLS packet. The reply is sent with a notification that indicates that the loop has been detected. The method 2600 then flows to the block 2715 and the method 2600 ends.

Figure 28:
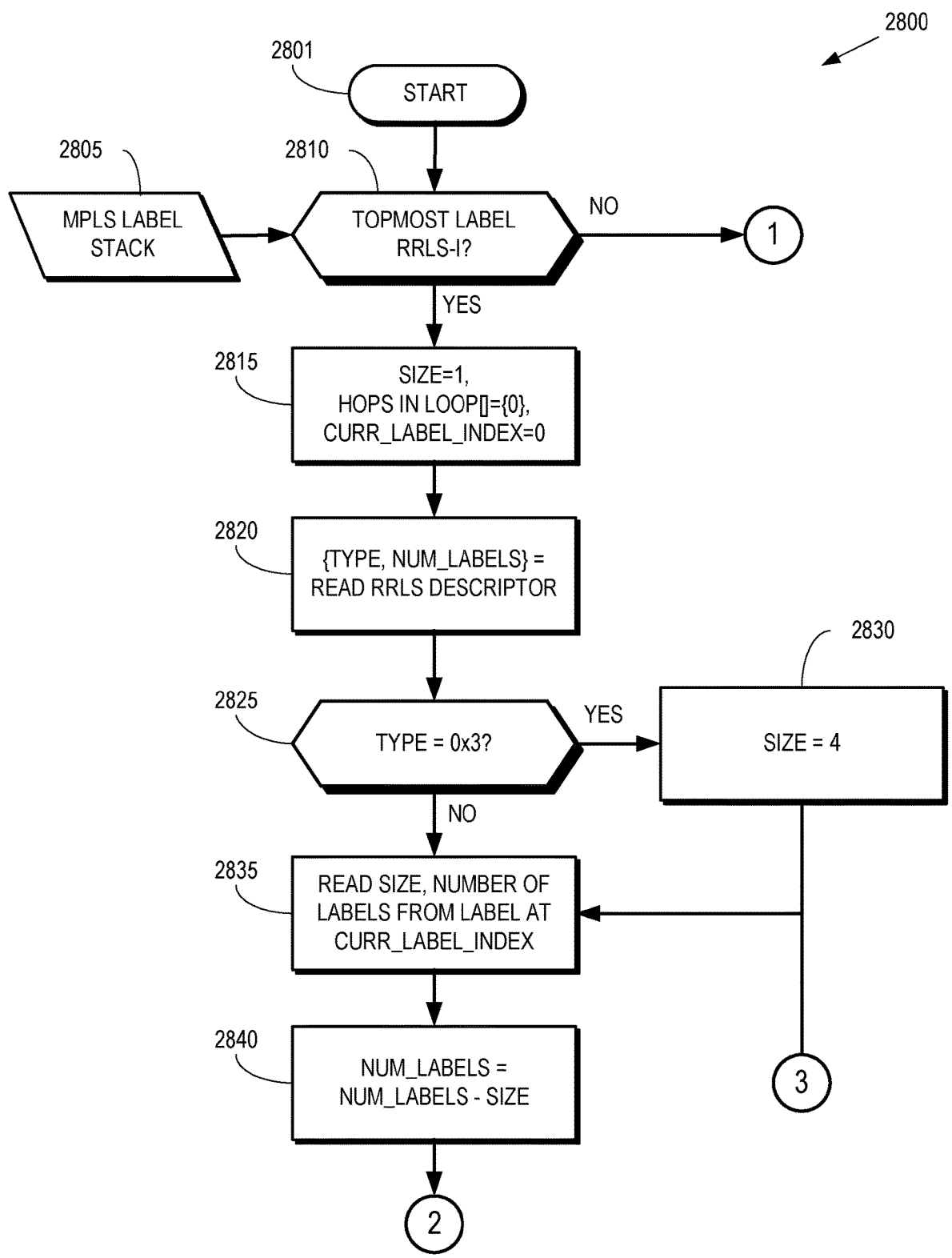
FIG. 28 is a flow diagram of a first portion of a method of responding to a loop detection notification according to some embodiments.

FIG. 28 is a flow diagram of a first portion of a method 2800 of responding to a loop detection notification according to some embodiments. The method 2800 is implemented by routers in some embodiments of the communication system 100 shown in FIG. 1, the communication system 600 shown in FIG. 6, the communication system 700 shown in FIG. 7, and the communication system 800 shown in FIG. 8.

The method 2800 begins at block 2801. At the input block 2805, a reporting entity receives a label stack that is received with the loop detection notification.

At decision block 2810, the reporting entity determines whether the label stack as an RRLS that describes the loop. The reporting entity checks for the loop by checking whether the topmost label in the label stack is RRLS-I. If the RRLS does not exist then the loop detection notification is a bad notification and the method 2800 flows to the node 1. If the RRLS that describes the loop is present in the label stack, the method 2800 flows to the block 2815.

At block 2815, the reporting entity initializes a set of local variables. Some embodiments of reporting entity initialize local variables as follows: (1) Size is initialized to 1 and subsequently used to track the size of a router label in units of labels used to encode the router label, (2) Hops_in_Loop is a list of router labels that is initialized is empty and eventually the router labels in the list describe the loop, and (3) Curr_Label_Index is initialized to zero and subsequently used to track the index of the label in the RRLS that is being read. At block 2820, the reporting entity reads the Type and NumLabels fields in the RRLS descriptor into local variables having the same name.

At decision block 2820, the reporting entity determines whether the Type is 0x3. If so, the method 2800 flows to the block 2830 and the value of the Size variable is set to four. The method 2800 then flows to the block 2835. If the Type is not 0x3, the method 2800 flows directly to the block 2835.

At block 2835, the reporting entity reads the router label at index Curr_Label_Index in the router label stack of the RRLS. At block 2840, the reporting entity decrements the value of NumLabels by Size to indicate that one router label has been read. The method 2800 then flows to the node 2.

Figure 29:
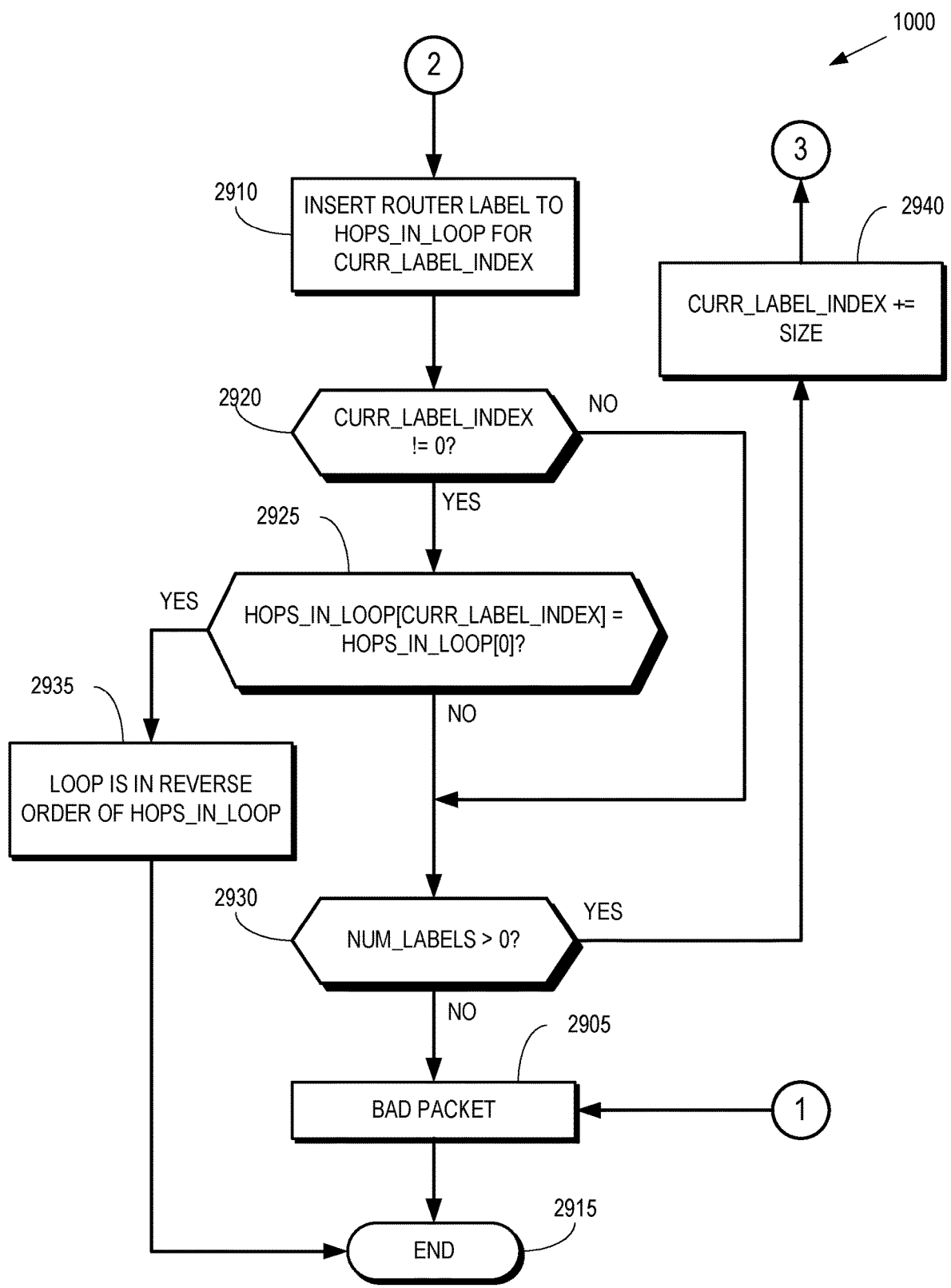
FIG. 29 is a flow diagram of a second portion of the method of responding to a loop detection notification according to some embodiments.

FIG. 29 is a flow diagram of a second portion of the method 2800 of responding to a loop detection notification according to some embodiments. The node 1 connects the decision block 2810 in FIG. 28 to the block 2905 in FIG. 29. The node 2 connects the block 2840 in FIG. 28 to the block 2910 in FIG. 29.

At block 2905, the reporting entity declares the packet is a bad notification packet because the loop is not found in the RRLS. The method 2800 then flows from block 2905 to block 2915 and the method 2800 ends.

At block 2910, the reporting entity inserts the router label into the position indicated by Curr_Label_Index in Hops_in_Loop. At decision block 2920, the reporting entity determines whether Curr_Label_Index is zero. This check is necessary because at least two hops are needed in Hops_in_Loop in order to compare and find the ends of the loop. If the value of Curr_Label_Index is not zero, the method 2800 flows to decision block 2925. If the value of Curr_Label_Index is zero, the method 2800 flows to decision block 2930.

At decision block 2925, the reporting entity compares the Size number of octets in Hops_in_Loop[Curr_Label_Index] with the Hop_In_Loop[0] (which is the anchor/detecting router in the loop) to check if they are same. If they are different, the method 2800 flows to decision block 2930. If they are the same, the method 2800 flows to block 2935.

At decision block 2930, the reporting entity determines whether the value of NumLabels is greater than zero, which indicates whether there are more labels in the RRLS to process. If so, the method 2800 flows to block 2940 and the value of Curr_Label_Index is incremented by the value of Size. The method 2800 then flows to node 3, which connects the block 2940 to the block 2835 in FIG. 28 so that the steps are repeated for the next label and the router label stack in the RRLS. If the value of NumLabels is not greater than zero, the method 2800 flows to block 2905 and the packet is declared a bad packet because no loop was found in the RRLS.

At block 2935, the reporting entity declares the Hop_In_Loop[ ] to be the list of router labels involved in the loop.

This information can therefore be used for further analysis. The method 2800 then flows to the block 2915 and the method 2800 ends.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

As used herein, the term "circuitry" may refer to one or more or all of the following:
a) hardware-only circuit implementations (such as implementations and only analog and/or digital circuitry) and
b) combinations of hardware circuits and software, such as (as applicable):
  i. a combination of analog and/or digital hardware circuit(s) with software/firmware and
  ii. any portions of a hardware processor(s) with software (including digital signal processor(s), software, and memory(ies) that work together to cause an apparatus, such as a mobile phone or server, to perform various functions) and
c) hardware circuit(s) and/or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in a server, a cellular network device, or other computing or network device.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. An apparatus, comprising:
at least one processor; and
at least one memory including computer program code;
wherein the at least one memory and the computer program code are configured to, with the at least one processor, cause the apparatus to at least:
  receive, by a router of a network over a primary path, a labeled data packet, wherein the router has associated therewith an identifier that uniquely identifies the router in the network; and
  associate, by the router with the labeled data packet based on a determination to reroute the labeled data packet from the primary path to an alternate path, a recorded route label stack including the identifier that uniquely identifies the router in the network.

2. The apparatus of claim 1, wherein the identifier that uniquely identifies the router in the network comprises at least one of a label assigned to the router from a central database for the network, an Internet protocol (IPv4) address of the router, an entire IPv6 address of the router, or a network-wide unique 4-octet portion of the IPv6 address of the router.

3. The apparatus of claim 1, wherein the recorded route label stack is pushed in the labeled data packet on top of a label of a label switched path for which loop detection is being performed.

4. The apparatus of claim 1, wherein the recorded route label stack is pushed in the labeled data packet below a label of a label switched path for which loop detection is being performed.

5. The apparatus of claim 1, wherein the recorded route label stack is pushed in the labeled data packet in response to loop detection being enabled at the router.

6. The apparatus of claim 1, wherein the at least one memory and the computer program code are configured to, with the at least one processor, cause the apparatus to at least:
send, by the router toward a next-hop router of the alternate path, the labeled data packet including the recorded route label stack.

7. The apparatus of claim 1, wherein the at least one memory and the computer program code are configured to, with the at least one processor, cause the apparatus to at least:
receive, by the router, a second labeled data packet; and
determine, by the router based on a determination that the second labeled data packet includes a second recorded route label stack, whether the identifier that uniquely identifies the router in the network is included in the second recorded route label stack.

8. The apparatus of claim 7, wherein the at least one memory and the computer program code are configured to, with the at least one processor, cause the apparatus to at least:
drop, by the router based on a determination that the identifier that uniquely identifies the router in the network is included in the second recorded route label stack, the second labeled data packet.

9. The apparatus of claim 7, wherein the at least one memory and the computer program code are configured to, with the at least one processor, cause the apparatus to at least:
generate, by the router based on a determination that the identifier that uniquely identifies the router in the network is included in the second recorded route label stack, a loop detection notification.

10. The apparatus of claim 9, wherein the loop detection notification comprises the identifier that uniquely identifies the router in the network.

11. The apparatus of claim 7, wherein the at least one memory and the computer program code are configured to, with the at least one processor, cause the apparatus to at least:
associate, by the router with the second labeled data packet based on a determination that the identifier that uniquely identifies the router in the network is not included in the second recorded route label stack, the identifier that uniquely identifies the router in the network.

12. A method comprising:
receiving, by a router of a network over a primary path, a labeled data packet, wherein the router has associated therewith an identifier that uniquely identifies the router in the network; and
associating, by the router with the labeled data packet based on a determination to reroute the labeled data packet from the primary path to an alternate path, a recorded route label stack including the identifier that uniquely identifies the router in the network.

13. The method of claim 12, wherein the identifier that uniquely identifies the router in the network comprises at least one of a label assigned to the router from a central database for the network, an Internet protocol (IPv4) address of the router, an entire IPv6 address of the router, or a network-wide unique 4-octet portion of the IPv6 address of the router.

14. The method of claim 12, wherein
the recorded route label stack is pushed in the labeled data packet on top of a label of a label switched path for which loop detection is being performed.

15. The method of claim 12, wherein the recorded route label stack is pushed in the labeled data packet below a label of a label switched path for which loop detection is being performed.

16. The method of claim 12, wherein the recorded route label stack is pushed in the labeled data packet in response to loop detection being enabled at the router.

17. The method of claim 12, further comprising:
sending, by the router toward a next-hop router of the alternate path, the labeled data packet including the recorded route label stack.

18. The method of claim 12, further comprising:
receiving, by the router, a second labeled data packet; and
determining, by the router based on a determination that the second labeled data packet includes a second recorded route label stack, whether the identifier that uniquely identifies the router in the network is included in the second recorded route label stack.

19. The method of claim 18, further comprising:
dropping, by the router based on a determination that the identifier that uniquely identifies the router in the network is included in the second recorded route label stack, the second labeled data packet.

20. The method of claim 18, further comprising:
generating, by the router based on a determination that the identifier that uniquely identifies the router in the network is included in the second recorded route label stack, a loop detection notification.

21. The method of claim 20, wherein the loop detection notification includes the identifier that uniquely identifies the router in the network.

22. The method of claim 18, further comprising:
associating, by the router with the second labeled data packet based on a determination that the identifier that uniquely identifies the router in the network is not included in the second recorded route label stack, the identifier that uniquely identifies the router in the network.

* * * * *